United States Patent
Igusa et al.

(10) Patent No.: US 11,983,388 B2
(45) Date of Patent: May 14, 2024

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Kiyoshi Igusa, Tokyo (JP); Takashi Totsuka, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/557,617

(22) Filed: Dec. 21, 2021

(65) Prior Publication Data

US 2022/0113849 A1 Apr. 14, 2022

Related U.S. Application Data

(63) Continuation of application No. PCT/JP2020/024842, filed on Jun. 24, 2020.

(30) Foreign Application Priority Data

Jun. 24, 2019 (JP) .................. 2019-116314

(51) Int. Cl.
*G06F 3/0483* (2013.01)
*G06F 3/0482* (2013.01)
(Continued)

(52) U.S. Cl.
CPC .............. *G06F 3/0483* (2013.01); *G06F 3/14* (2013.01); *H04N 21/2407* (2013.01);
(Continued)

(58) Field of Classification Search
CPC ........ G06F 3/0483; G06F 3/14; G06F 3/0482; H04N 21/2407; H04N 21/251; H04N 21/2668
See application file for complete search history.

(56) References Cited

U.S. PATENT DOCUMENTS 8,793,575 B1 * 7/2014 Lattyak ................. G06F 40/131
715/273
9,955,216 B2 * 4/2018 Cordray ............... H04N 21/858
(Continued)

FOREIGN PATENT DOCUMENTS

JP 2012118624 A 6/2012
JP 2014228968 A 12/2014
(Continued)

OTHER PUBLICATIONS

Reddit Post, "Do Premium episodes become free after a certain period of time?" dated Oct. 11, 2018 (hereinafter "Reddit Post")., available at https://www.reddit.com/r/vrv/comments/9ngkto/do_premium_episodes_become_free_after_a_certain/ (Year: 2018).*
(Continued)

Primary Examiner — James T Tsai
(74) Attorney, Agent, or Firm — Osha Bergman Watanabe & Burton LLP

(57) ABSTRACT

A non-transitory computer readable medium stores a program causing a computer to execute: viewably displaying, on the basis of an operation performed by a user, any of a plurality of partial content items constituting content; storing view history of the content; determining, on the basis of the view history, a type of view state of the content if at least one of the partial content items constituting the content has been viewed; determining, on the basis of the type of view state, whether or not the content satisfies a display condition set for each type of view state, the display condition including a condition that the content has a partial content item that has not been viewed; and displaying, in a predetermined display area, an image indicating the content if the content satisfies the display condition.

5 Claims, 30 Drawing Sheets

(51) Int. Cl.
   *G06F 3/14* (2006.01)
   *H04N 21/24* (2011.01)
   *H04N 21/25* (2011.01)
   *H04N 21/2668* (2011.01)

(52) U.S. Cl.
   CPC ....... *H04N 21/251* (2013.01); *H04N 21/2668* (2013.01); *G06F 3/0482* (2013.01)

(56) References Cited

U.S. PATENT DOCUMENTS

| | | | | |
|---|---|---|---|---|
| 10,817,142 | B1* | 10/2020 | Paul | G06F 3/0482 |
| 2007/0157237 | A1* | 7/2007 | Cordray | H04N 21/47 |
| | | | | 725/89 |
| 2009/0158326 | A1* | 6/2009 | Hunt | G06F 16/743 |
| | | | | 725/38 |
| 2011/0016396 | A1* | 1/2011 | Maruyama | H04N 21/44204 |
| | | | | 715/716 |
| 2014/0095991 | A1* | 4/2014 | Abe | G06F 16/44 |
| | | | | 715/255 |
| 2014/0198027 | A1* | 7/2014 | Edelstein | G06F 21/00 |
| | | | | 345/156 |
| 2015/0220253 | A1* | 8/2015 | Landau | G06F 3/0483 |
| | | | | 715/204 |
| 2016/0088101 | A1* | 3/2016 | Batiste | H04L 67/535 |
| | | | | 709/224 |
| 2016/0140249 | A1* | 5/2016 | Flawn | G06F 3/0483 |
| | | | | 715/205 |
| 2016/0231921 | A1* | 8/2016 | Landau | G06F 3/0488 |
| 2018/0063591 | A1* | 3/2018 | Newman | H04N 21/47217 |
| 2019/0171341 | A1* | 6/2019 | Eubanks | H04N 21/43076 |
| 2020/0068274 | A1* | 2/2020 | Aher | H04N 21/4825 |
| 2020/0304863 | A1* | 9/2020 | Domm | H04L 67/55 |
| 2021/0181901 | A1* | 6/2021 | Johnston | H04N 21/42224 |
| 2021/0306711 | A1* | 9/2021 | Ellingford | H04N 21/41407 |
| 2022/0043627 | A1* | 2/2022 | Sugiura | H04N 5/775 |
| 2022/0113849 | A1* | 4/2022 | Igusa | H04N 21/4756 |

FOREIGN PATENT DOCUMENTS

| | | |
|---|---|---|
| JP | 2016066115 A | 4/2016 |
| JP | 2018011186 A | 1/2018 |

OTHER PUBLICATIONS

Office Action issued in Japanese Application No. 2019-116314; dated Oct. 8, 2021 (3 pages).

International Search Report issued in International Application No. PCT/JP2020/024842, dated Aug. 25, 2020 (5 pages).

Written Opinion issued in International Application No. PCT/JP2020/024842; dated Aug. 25, 2020 (3 pages).

* cited by examiner

| TYPE | DETERMINATION CONDITION | START CONDITION | END CONDITION |
|---|---|---|---|
| PREVIOUS READ-IN-ADVANCE (FIRST TYPE) | PAID CHAPTER PURCHASED SINCE PREVIOUS UPDATE DATE | PAID CHAPTER X EPISODE(S) AHEAD NOT VIEWED | PAID CHAPTERS X EPISODE(S) AHEAD VIEWED |
| FREE LATEST EPISODE (SECOND TYPE) | FREE LATEST CHAPTER VIEWED SINCE PREVIOUS UPDATE DATE | FREE LATEST CHAPTER NOT VIEWED | FREE LATEST CHAPTER VIEWED |
| LEAVE ON READ-IN-ADVANCE (THIRD TYPE) | EPISODE N AS PAID CHAPTER VIEWED | EPISODE N+1 IS FREE LATEST CHAPTER | EPISODE N+1 VIEWED |
| MULTIPLE EPISODE VIEW (FOURTH TYPE) | TWO OR MORE EPISODES VIEWED | WITHIN 30 DAYS FROM LAST VIEWED DATE | FREE LATEST CHAPTER VIEWED |

FIG.7A

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2020/024842, filed on Jun. 24, 2020, which claims priority to Japanese Patent Application No. 2019-116314, filed on Jun. 24, 2019, the entire contents of which are incorporated by reference herein.

BACKGROUND ART

Technical Field

The present invention relates to information processing programs, information processing methods, and information processing systems.

As described in, for example, PTL 1, there are conventionally well-known information processing systems in which a read (viewed) portion and an unread (unviewed) portion of digital content are displayed such that the read and unread portions can be discriminated from each other.

CITATION LIST

Patent Literature

Patent Literature 1: JP 2016-066115 A

SUMMARY OF INVENTION

Technical Problem

In some information processing systems, one content item may be provided in the form of a plurality of partial content items constituting the content item. If the content item is, for example, an e-comic book, a new partial content item composed of one episode is provided at every predetermined update timing.

In such an information processing system, if a user is notified of all content items having a newly available partial content item, the user is notified of updated content items that might not be interesting to the user. This is problematic in that it takes a long time until the user can access desired content items.

An object of the present invention is to provide an information processing program, an information processing method, and an information processing system that allow a user to easily view his/her intended content.

Solution to Problem

In order to solve the above-described problem, an information processing program causes a computer to function as: a content display control unit for viewably displaying, on the basis of an operation performed by a user, any of a plurality of partial content items constituting content; a view history storage unit for storing view history of the content; a type determination unit that determines, on the basis of the view history, a type of view state of the content if at least one of the partial content items constituting the content has been viewed; a condition determination unit that determines, on the basis of the type of view state, whether or not the content satisfies a display condition set for the type of view state, said display condition including a condition that the content has a partial content item that has not been viewed; and a display control unit for displaying, in a predetermined display area, an image indicating the content if the content satisfies the display condition.

The partial content items may include at least one paid partial content item that can be viewed by consuming predetermined value information and at least one free partial content item that can be viewed without consuming the value information, and, at a predetermined update timing, a new paid partial content item may be added to the content, and the at least one paid partial content item may include a paid partial content item that is changed to a new free partial content item.

The type determination unit may determine that the type of view state is a first type in the case where the at least one paid partial content item or the new paid partial content item includes a paid partial content item that has been viewed by the user since the previous update timing, and the display condition for the first type may be set as a condition that the at least one paid partial content item or the new paid partial content item includes a paid partial content item that has not been viewed.

The type determination unit may determine that the type of view state is a second type in the case where the user viewed all of the at least one free partial content item before the update timing, and the display condition for the second type may be set as a condition that the at least one free partial content item or the new free partial content item includes a free partial content item that has not been viewed since the update timing.

The type determination unit may determine that the type of view state is a third type in the case where the at least one paid partial content item or the new paid partial content item includes a paid partial content item that has been viewed by the user, and the display condition for the third type may be set as a condition that the at least one free partial content item or the new free partial content item includes a free partial content item that has not been viewed.

The type determination unit may determine that the type of view state is a fourth type in the case where the user has viewed two or more of the plurality of partial content items constituting the content, and the display condition for the fourth type may be set as a condition that the partial content items constituting the content include a partial content item that has not been viewed.

In order to solve the above-described problem, an information processing method includes: viewably displaying, on the basis of an operation performed by a user, any of a plurality of partial content items constituting content; storing view history of the content; determining, on the basis of the view history of the user, a type of view state of the content if at least one of the partial content items constituting the content has been viewed; determining, on the basis of the type of view state of the content, whether or not the content satisfies a display condition set for the type of view state, said display condition including a condition that the content has a partial content item that has not been viewed; and displaying, in a predetermined display area, an image indicating the content if the content satisfies the display condition.

In order to solve the above-described problem, an information processing system includes: a content display control unit for viewably displaying, on the basis of an operation performed by a user, any of a plurality of partial content items constituting content; a view history storage unit for storing view history of the content; a type determination unit that determines, on the basis of the view history of the user, a type of view state of the content if at least one of the partial content items constituting the content has been viewed; a condition determination unit that determines, on the basis of the type of view state of the content, whether or not the content satisfies a display condition set for the type of view state, said display condition including a condition that the content has a partial content item that has not been viewed; and a display control unit for displaying, in a predetermined display area, an image indicating the content if the content satisfies the display condition.

Effects of Disclosure

According to the present invention, a user can easily view intended content.

BRIEF DESCRIPTION OF DRAWINGS

FIG. 7A is a diagram for illustrating types of view state, determination conditions, start conditions, and end conditions.

DESCRIPTION OF EMBODIMENTS

An aspect of an embodiment of the present invention will be described below in detail with reference to the accompanying drawings. The dimensions, materials, other specific values, etc. given in this embodiment are merely examples for facilitating understanding, and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Entire Configuration of Information Processing System S)

Figure 1:
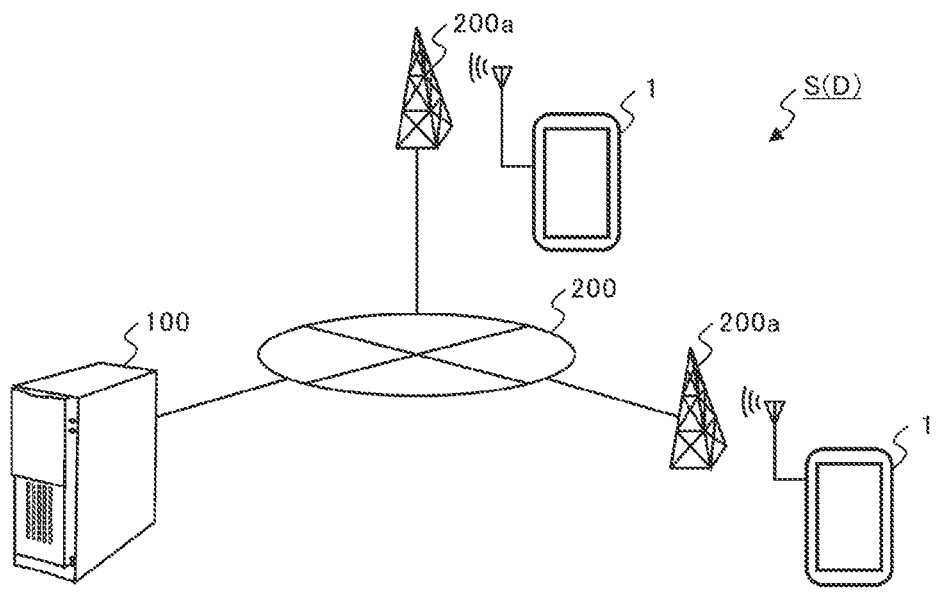
FIG. 1 is an illustration showing a schematic configuration of an information processing system.

FIG. 1 is an illustration showing a schematic configuration of an information processing system S. The information processing system S is what is called a client-server system, including user terminals 1, a server 100, and a communication network 200 having communication base stations 200*a*.

Each of the user terminals 1 can establish communication with the server 100 via the communication network 200. The user terminal 1 widely includes electronic appliances that can be communicatively connected to the server 100 in a wired or wireless manner. Examples of the user terminal 1 include smartphones, mobile phones, tablet devices, personal computers, etc. This embodiment will be described in the context of the case where a smartphone is used as the user terminal 1.

The server 100 is communicatively connected to the plurality of user terminals 1. The server 100 accumulates various types of information (user information) for each user ID for identifying a user who views content. In addition, the server 100 provides content to the user terminals 1.

The communication base stations 200*a* are connected to the communication network 200, and wirelessly send/receive information to/from the user terminals 1. The communication network 200 is configured of a mobile phone network, the Internet, a local area network (LAN), a dedicated line, etc., and realizes wired or wireless communicative connection between the user terminals 1 and the server 100.

In the information processing system S in this embodiment, each of the user terminals 1 and the server 100 function as an information processing device D. The user terminal 1 and the server 100 individually have assigned thereto roles for controlling content viewing such that it is possible to view content through cooperation between the user terminal 1 and the server 100.

(Hardware Configurations of User Terminal 1 and Server 100)

Figure 2A:
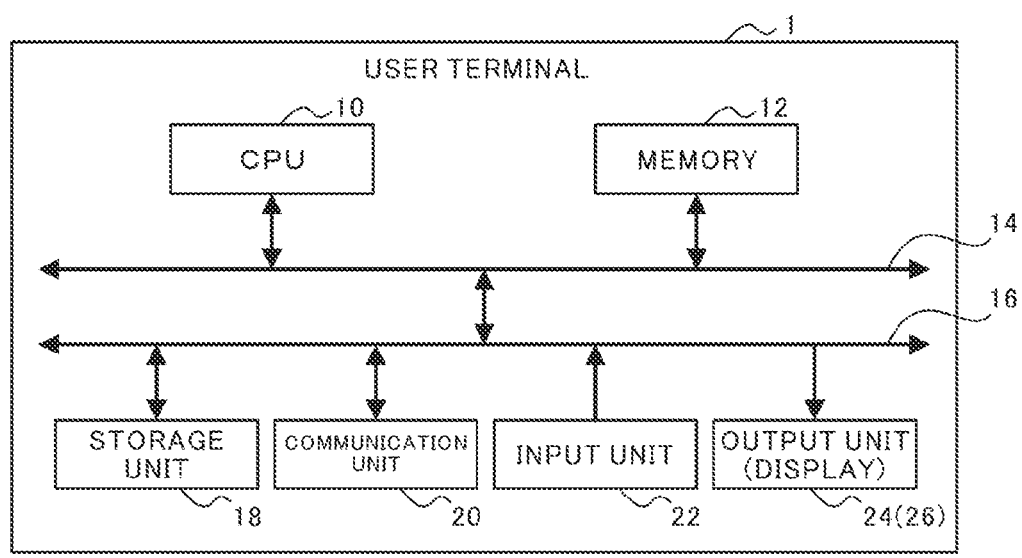
FIG. 2A is a diagram for illustrating the hardware configuration of a user terminal.
Figure 2B:
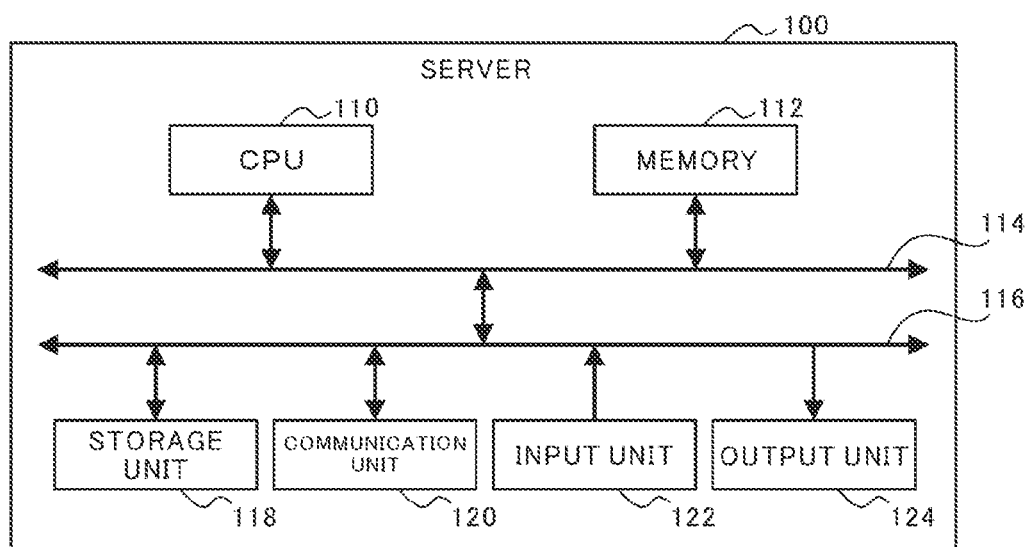
FIG. 2B is a diagram for illustrating the hardware configuration of a server.

FIG. 2A is a diagram for illustrating the hardware configuration of the user terminal 1. In addition, FIG. 2B is a diagram for illustrating the hardware configuration of the server 100. As shown in FIG. 2A, the user terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 100 is configured to include a CPU 110, a memory 112, a bus 114, an input/output interface 116, a storage unit 118, a communication unit 120, an input unit 122, and an output unit 124.

The configurations and functions of the CPU 110, the memory 112, the bus 114, the input/output interface 116, the storage unit 118, the communication unit 120, the input unit 122, and the output unit 124 of the server 100 are substantially the same as those of the CPU 10, the memory 12, the bus 14, the input/output interface 16, the storage unit 18, the communication unit 20, the input unit 22, and the output unit 24, respectively, of the user terminal 1. Thus, a description of the hardware configuration of the user terminal 1 will be given below, and a description of the server 100 will be omitted.

The CPU 10 runs programs stored in the memory 12 to control content viewing. The memory 12 is configured of a read only memory (ROM) or a random access memory (RAM), and stores the programs and various types of data needed for controlling content viewing. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various types of programs and data. At the user terminal 1, the programs and data stored in the storage unit 18 are loaded into the memory 12 (RAM) by the CPU 10.

The communication unit 20 is communicatively connected to a communication base station 200a in a wireless manner and sends/receives information, such as various types of data and programs, to/from the server 100 via the communication network 200. At the user terminal 1, the programs, etc. received from the server 100 are stored in the memory 12 or the storage unit 18.

The input unit 22 is configured of, for example, a touchscreen, buttons, a keyboard, a mouse, arrow keys, or an analog controller with which user's operations are input (operations are accepted). Alternatively, the input unit 22 may be a special controller provided in the user terminal 1 or connected (externally attached) to the user terminal 1. Alternatively, the input unit 22 may be configured of an acceleration sensor that detects tilting or movement of the user terminal 1 or a microphone that detects the speech of the user. In short, the input unit 22 widely includes devices that allow the user to input his/her intents thereto in distinguishable manners.

The output unit 24 is configured to include a display device and a speaker. Note that the output unit 24 may be a device connected (externally attached) to the user terminal 1. In this embodiment, the user terminal 1 is provided with a display 26 as the output unit 24 and is provided with a touchscreen as the input unit 22, wherein the touchscreen is overlaid on the display 26.

(Content Viewing)

Next, content viewing control executed by the information processing system S (information processing device D) according to this embodiment will be described by using one example. In this embodiment, a plurality of content items each composed of a plurality of partial content items are provided. Here, this embodiment will be described by way of an example where the content is e-comic books. Each of the e-comic books is composed of chapters (episodes) serving as partial content items. Note that the content is not limited to e-comic books but may include moving images, a single static image, and music, and any type of content is acceptable as long as the content is composed of a plurality of partial content items. In addition, the partial content items should desirably constitute a series.

A dedicated application for viewing e-comic books is provided from the server 100 to the user terminal 1. E-comic books can be viewed in the user terminal 1 by downloading the dedicated application for viewing e-comic books and then executing the application. The server 100 assigns a user ID to each of the user terminals 1 that have downloaded the dedicated application for viewing e-comic books thereinto and stores user information including at least view history and value information of each of the e-comic books for each of the user IDs. In addition, the server 100 adds and updates chapters of the e-comic book at predetermined update timings. In this embodiment, the server 100 adds a new chapter once a week. Note that the update timing is not limited to a frequency of once a week but may be various frequencies, such as once every two weeks or twice a week.

The view history includes, for each of the content items (e-comic books), information about at least the date and time at which the content (e-comic book) was viewed last and viewed chapters of the content.

The value information is used when some content items are viewed and is provided as coins in this embodiment. As the value information (coins), free value information (free coins) provided for free and paid value information (paid coins) provided at the user's expense are stored in the server 100 in such a manner as to be discriminated from each other. Note that free coins and paid coins are referred to just as coins in the case where they are explained without being discriminated from each other.

Figure 3A:
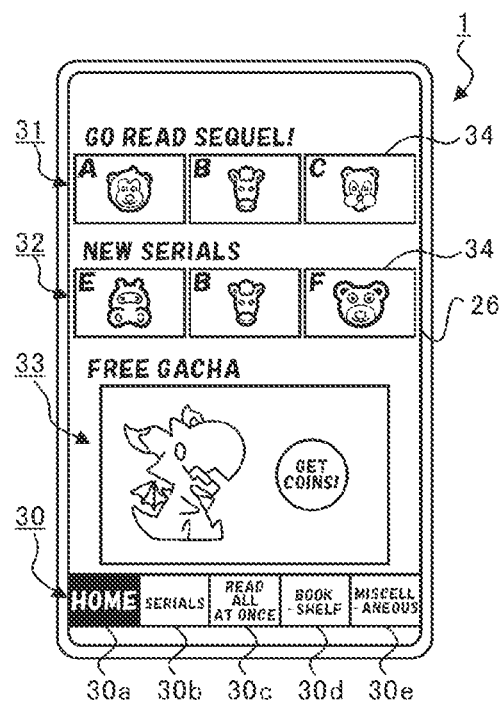
FIG. 3A is a diagram showing an example of a home screen.
Figure 3B:
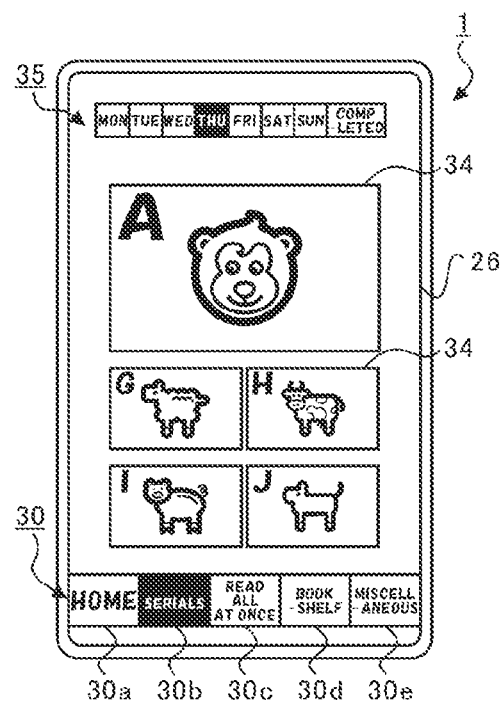
FIG. 3B is a diagram for illustrating an example of a serial screen.
Figure 3C:
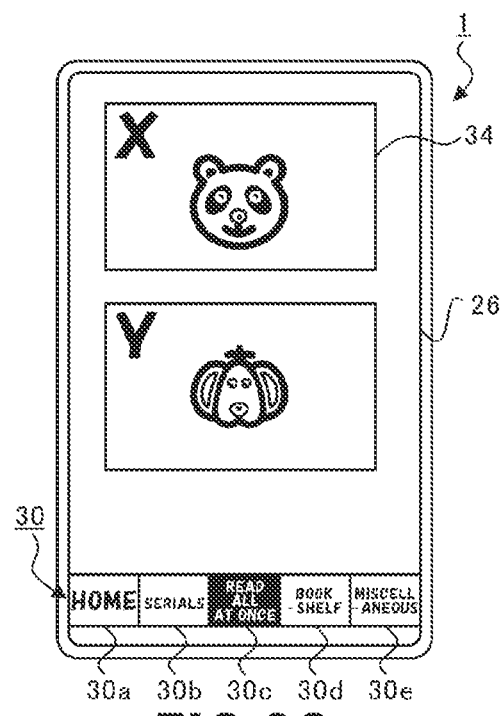
FIG. 3C is a diagram showing an example of a read-all-at-once screen.
Figure 3D:
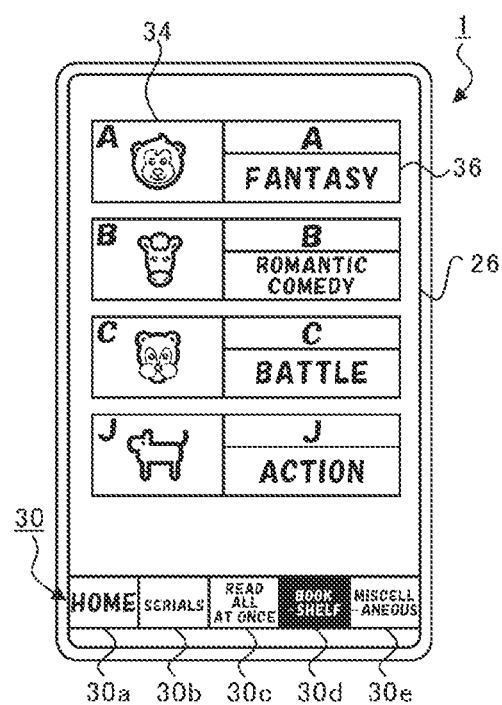
FIG. 3D is a diagram for illustrating an example of a bookshelf screen.

FIG. 3A is a diagram showing an example of a home screen. FIG. 3B is a diagram for illustrating an example of a serial screen. FIG. 3C is a diagram showing an example of a read-all-at-once screen. FIG. 3D is a diagram for illustrating an example of a bookshelf screen.

When the dedicated application for viewing e-comic books is executed, the user terminal 1 displays, on the display 26, the home screen shown in FIG. 3A as the initial screen. In the lower section of the home screen, a menu bar 30 is displayed. A plurality of operating sections that can be operated (tapped) by the user are provided in the menu bar 30. In the menu bar 30, a home screen operating section 30a captioned "home", a serial screen operating section 30b captioned "serial", a read-all-at-once-screen operating section 30c captioned "read all at once", a bookshelf screen operating section 30d captioned "bookshelf", and a miscellaneous screen operating section 30e captioned "miscellaneous" are provided.

When the home screen operating section 30a is tapped, the home screen shown in FIG. 3A is displayed on the display 26. In addition, when the serial screen operating section 30b is tapped, the serial screen shown in FIG. 3B is displayed on the display 26. Similarly, when the read-all-at-once screen operating section 30c is tapped, the read-allat-once screen shown in FIG. 3C is displayed on the display 26. In addition, when the bookshelf screen operating section 30*d* is tapped, the bookshelf screen shown in FIG. 3D is displayed on the display 26. In addition, when the miscellaneous screen operating section 30*e* is tapped, a miscellaneous screen (not shown in the figure) is displayed on the display 26. Although not described in detail, the miscellaneous screen displays coins associated with the user ID, allows paid coins to be purchased, etc.

In the menu bar 30, an operating section corresponding to each screen is highlighted so that the screen being displayed on the display 26 can be identified.

On the home screen, a recommended-comics display area 31, a new-serial display area 32, and a free gacha display area 33 are provided in that order from top to bottom. In the recommended-comics display area 31, one or more comic icons 34 are displayed together with a character string "Go read sequel!". The comic icons 34 are set individually for each of the e-comic books. Each of the comic icons 34 is an image representing the e-comic book so as to help the user easily identify, for example, an image of the main character in the e-comic book and the title of the e-comic book.

In the recommended-comics display area 31, the comic icons 34 of e-comic books that have been viewed by the user at least once are displayed when a predetermined display condition is satisfied, as described below in detail. Note that a maximum of nine comic icons 34 can be displayed in the recommended-comics display area 31. Also, in the case where ten or more e-comic books satisfy a display condition, a predetermined icon is displayed in the recommended-comics display area 31, and when the predetermined icon is operated, a screen for displaying the comic icons 34 of all e-comic books satisfying the display condition is displayed on the display 26.

In the new-serial display area 32, the comic icons 34 of new serial e-comic books are displayed. Note that new serial e-comic books refer to e-comic books added newly to the server 100 and e-comic books that have already been added to the server 100 and that have begun to be provided newly. In the free gacha display area 33, for example, an image that can accept the user's operation once a day is displayed, so that when the user operates the image, a predetermined number of free coins are bestowed on the user.

When the serial screen operating section 30*b* is tapped, the serial screen shown in FIG. 3B is displayed on the display 26. In the upper section of the serial screen, a day-of-week selection section 35 is displayed. The day-of-week selection section 35 includes: seven selection sections ("Mon" to "Sun") for displaying the comic icons 34 of e-comic books having an update date on the selected day, one of Monday through Sunday; and another selection section ("completed") for displaying the comic icons 34 of completed e-comic books. In the day-of-week selection section 35, the selected operating section is highlighted so that the selected day of the week (or "completed") can be identified. On the serial screen, the comic icons 34 of e-comic books the update date of which corresponds to the day of week selected in the day-of-week selection section 35 (or the comic icons 34 of completed e-comic books) are displayed below the day-of-week selection section 35. Note that the menu bar 30 is displayed on the serial screen.

When the read-all-at-once screen operating section 30*c* is tapped, the read-all-at-once screen shown in FIG. 3C is displayed on the display 26. On the read-all-at-once screen, the comic icons 34 of completed e-comic books are displayed. Note that the menu bar 30 is displayed on the read-all-at-once screen.

When the bookshelf screen operating section 30*d* is tapped, the bookshelf screen shown in FIG. 3D is displayed on the display 26. On the bookshelf screen, the comic icons 34 of e-comic books that have been viewed by the user at least once are listed on the basis of the user's view history. In addition, a comic description field 36 in which the title of the e-comic book and the summary of the e-comic book are described is displayed on the right of the comic icon 34. Note that the menu bar 30 is displayed on the bookshelf screen.

Figure 4A:
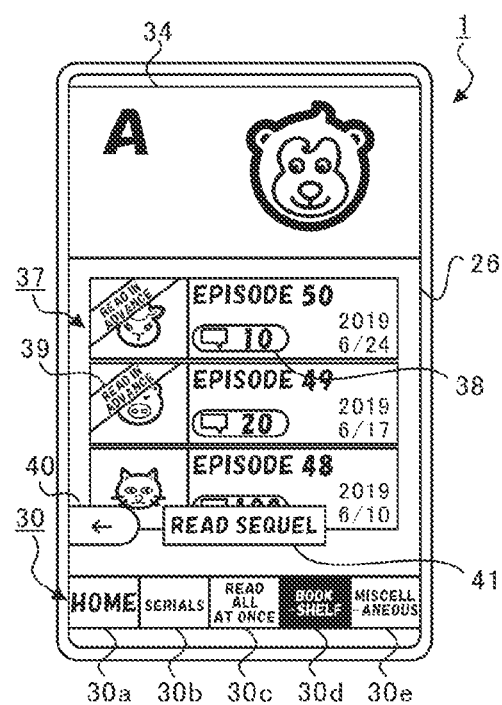
FIG. 4A is a first diagram showing an example of a chapter selection screen.
Figure 4B:
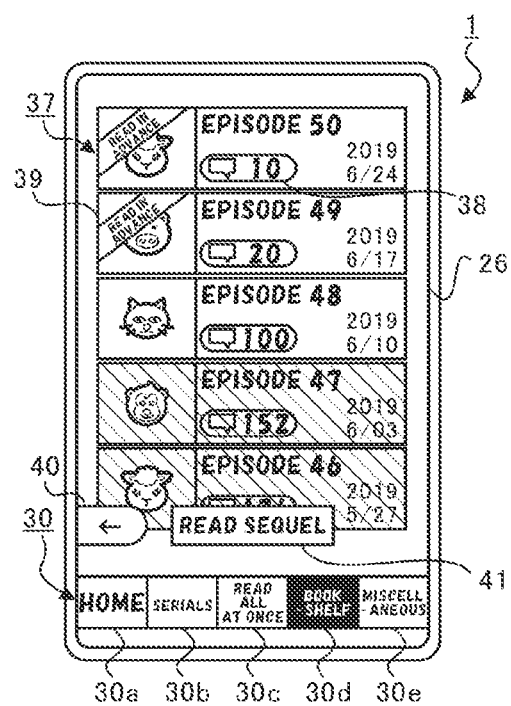
FIG. 4B is a second diagram showing an example of the chapter selection screen.
Figure 4C:
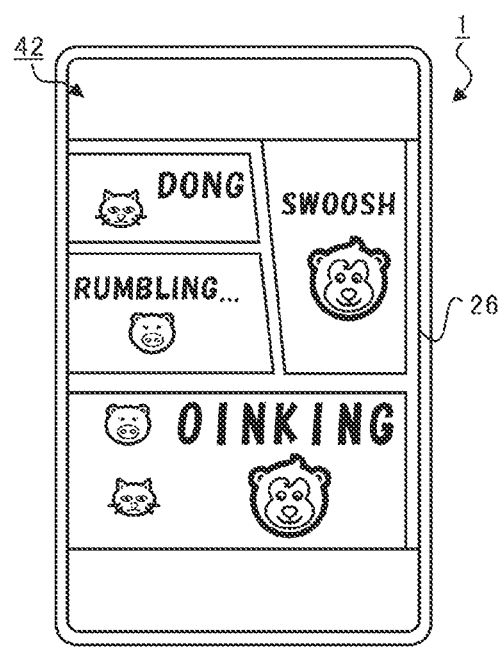
FIG. 4C is a diagram showing an example of an e-comic book screen.
Figure 4D:
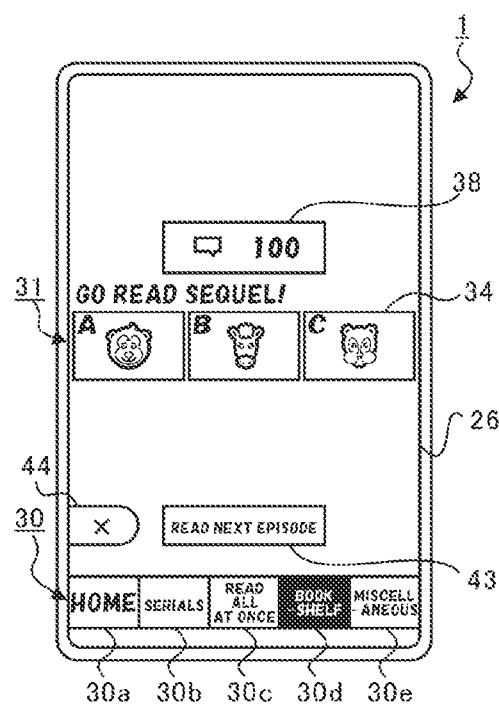
FIG. 4D is a diagram showing an example of an end screen.

FIG. 4A is a first diagram showing an example of a chapter selection screen. FIG. 4B is a second diagram showing an example of the chapter selection screen. FIG. 4C is a diagram showing an example of an e-comic book screen. FIG. 4D is a diagram showing an example of an end screen.

When a comic icon 34 displayed on the home screen, the serial screen, the read-all-at-once screen, or the bookshelf screen is tapped, the chapter selection screen pertaining to the e-comic book indicated by the tapped comic icon 34 is displayed on the display 26, as shown in FIGS. 4A and 4B. In the upper section of the chapter selection screen, the comic icon 34 is displayed, and below the comic icon 34, chapter selection images 37 for selecting the respective chapters are displayed. For the chapter selection images 37, the chapter with the latest update date (latest chapter) is displayed at the top, and the other chapters are displayed in newest-first order of update date from top to bottom. On each of the chapter selection images 37, an image of one representative scene of the chapter, the chapter number (e.g., "episode 50"), and the update date of the chapter are displayed. The chapter selection image 37 further includes a comment operating section 38. Note that details of the comment operating section 38 will be described later.

On the chapter selection screen, the chapter selection images 37 are scroll-displayed by the user performing a scroll operation. In addition, on the chapter selection screen, the chapter selection images 37 of chapters that have been viewed by the user on the basis of the user's view history (chapter selection images 37 of episode 47 and episode 46 in FIG. 4B) are displayed darker than the other chapter selection images 37. By doing so, the chapters that have been viewed by the user can be easily identified.

In addition, a read-in-advance ribbon 39 captioned "read in advance" is superimposed on the chapter selection images 37 of the chapter as the latest episode and the chapter one episode older than the latest episode (chapter selection images 37 of episode 50 and episode 49 in FIG. 4A). In this embodiment, the chapter serving as the latest episode and the chapter one episode older than the latest episode can be viewed by consuming coins. Thus, chapters that can be viewed by consuming coins are referred to as paid chapters (paid partial content items), and chapters that can be viewed without consuming coins are referred to as free chapters (free partial content items).

In other words, the read-in-advance ribbon 39 on a chapter indicates that the chapter can be viewed by consuming coins. Let us assume that an e-comic book with the title "A" is updated, for example, every Thursday (0:00 on Thursday). In this case, a new chapter is added as a paid chapter at 0:00 on Thursday. In addition, the chapter two episodes older than this newly added chapter is changed from a paid chapter to a free chapter.

In addition, on the chapter selection screen, a return operating section 40 and a continued read operating section 41 are displayed above the menu bar 30. When the return operating section 40 is tapped, the home screen, the serial screen, the read-all-at-once screen, or the bookshelf screen that was displayed before this chapter selection screen is displayed is displayed on the display 26.

When any one of the chapter selection images 37 displayed on the chapter selection screen is tapped, the e-comic book screen for the chapter corresponding to the tapped chapter selection image 37 is displayed on the display 26 as shown in FIG. 4C. Although not described in detail, when the chapter selection image 37 of a paid chapter is tapped, not only is the number of coins required to view the paid chapter displayed but also an operating section for selecting whether or not to view the paid chapter by consuming the number of coins is displayed.

Here, when any one of the chapter selection images 37 is tapped, the user terminal 1 transmits, to the server 100, view request information for requesting viewing of the chapter corresponding to the tapped chapter selection image 37. The server 100 updates the view history on the basis of the transmitted view request information and transmits, to the user terminal 1, URL information indicating a URL of that chapter. The user terminal 1 accesses the URL indicated in the transmitted URL information, thereby downloading the image of the chapter and displaying the image on the e-comic book screen.

In addition, when the continued read operating section 41 is tapped, the user terminal 1 transmits, to the server 100, view request information for requesting viewing of the chapter following the latest chapter viewed by the user. By doing so, an image of the chapter following the latest chapter viewed by the user is displayed on the e-comic book screen in the user terminal 1.

Each of the chapters is composed of a plurality of page images 42 corresponding to a plurality of pages. On the e-comic book screen, one page image 42 of the plurality of page images 42 constituting the chapter is displayed. Then, when the user performs a flick operation, the next page image 42 is displayed on the display 26.

Also, when a flick operation is performed while the final page image 42 of the chapter is displayed, the end screen shown in FIG. 4D is displayed on the display 26. On the end screen, not only the menu bar 30, the recommended-comics display area 31, and the comment operating section 38 but also a next-episode operating section 43 for selecting the next chapter and a screen close operating section 44 are displayed on the display 26.

When the next-episode operating section 43 is tapped, the user terminal 1 transmits, to the server 100, view request information for requesting viewing of the chapter following the chapter that has been viewed. By doing so, the user can continue to view the next chapter on the user terminal 1.

Figure 5A:
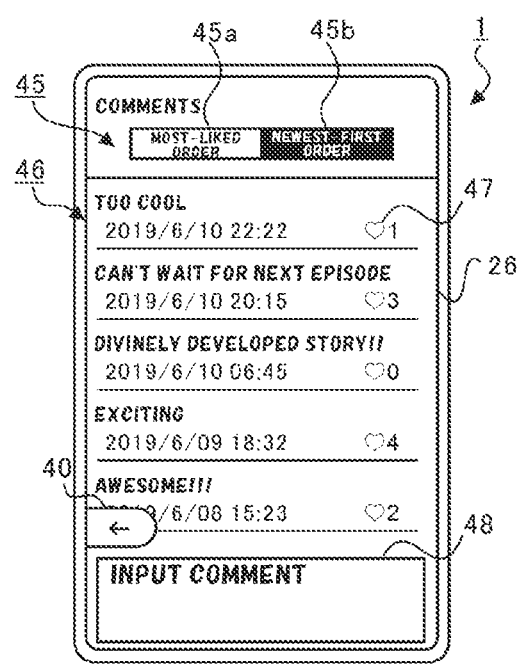
FIG. 5A is a first diagram for illustrating an example of a comment list screen.
Figure 5B:
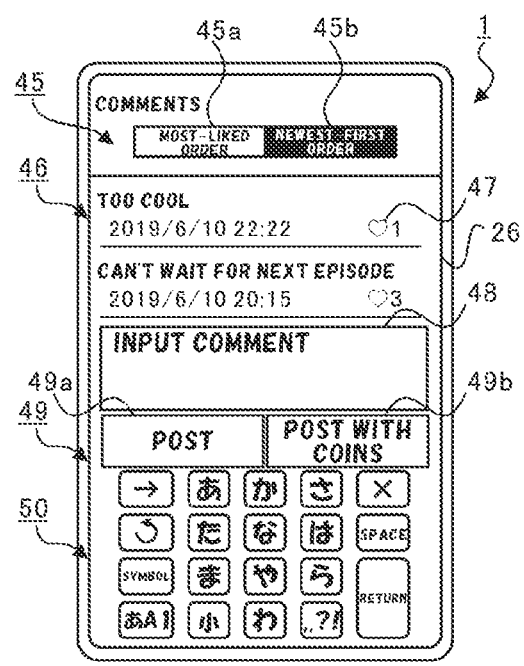
FIG. 5B is a second diagram for illustrating an example of the comment list screen.
Figure 5C:
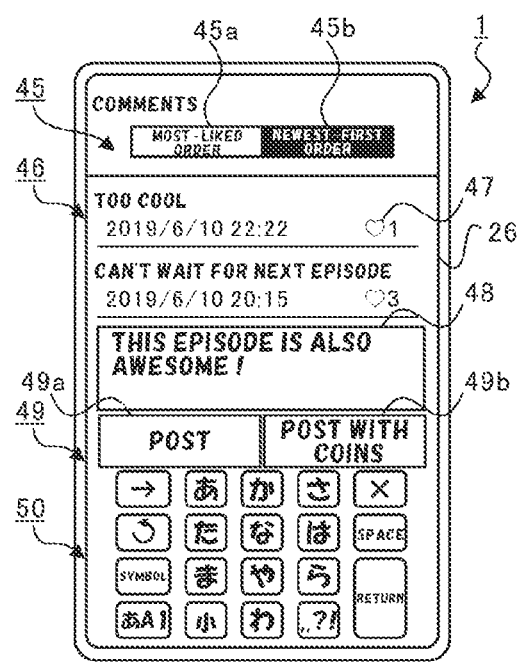
FIG. 5C is a third diagram for illustrating an example of the comment list screen.
Figure 5D:
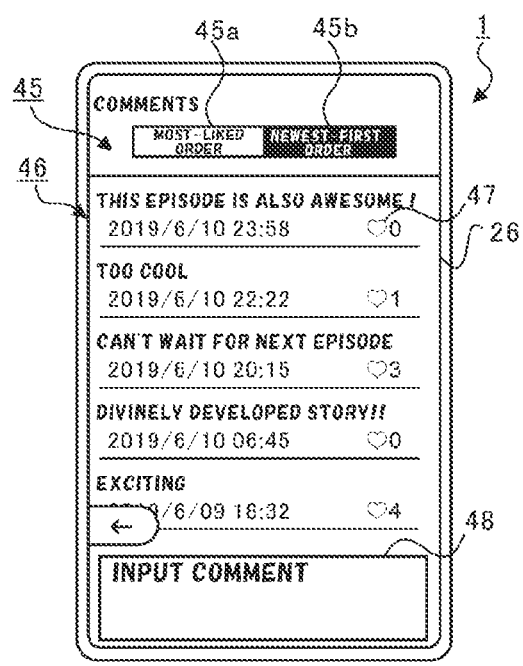
FIG. 5D is a fourth diagram for illustrating an example of the comment list screen.

FIG. 5A is a first diagram for illustrating an example of a comment list screen. FIG. 5B is a second diagram for illustrating an example of the comment list screen. FIG. 5C is a third diagram for illustrating an example of the comment list screen. FIG. 5D is a fourth diagram for illustrating an example of the comment list screen.

The comment operating section 38 shown in FIGS. 4A, 4B, and 4D is provided for each chapter. The number of comments is also displayed together in the comment operating section 38. The number of comments being displayed indicates the total number of comments posted by all users. Therefore, it is possible to grasp the popularity of the chapter or the e-comic book to some degree by confirming the number of comments.

When the comment operating section 38 is tapped, the comment list screen shown in FIG. 5A is displayed on the display 26. Here, when the comment operating section 38 is tapped, the user terminal 1 transmits, to the server 100, comment request information for requesting a list of comments on the chapter provided with that tapped comment operating section 38. The server 100 transmits, to the user terminal 1, comment list information including all comments on the chapter corresponding to the transmitted comment request information. The user terminal 1 displays the comment list screen on the display 26 on the basis of the transmitted comment list information.

In the upper section of the comment list screen, a display-order change operating section 45 is provided. The display-order change operating section 45 includes a most-liked-order operating section 45*a* and a newest-first-order operating section 45*b*. Also, the newest-first-order operating section 45*b* is selected in the initial state.

In addition, a comment display area 46 in which comments are listed is provided in the center of the comment list screen. In the comment display area 46, comments are displayed in the order based on the selection made in the display-order change operating section 45. In FIGS. 5A to 5D, comments are displayed such that newer comments come at higher positions on the basis of the selection made in the newest-first-order operating section 45*b*.

In the comment display area 46, specifics of each comment ("Too cool", "Can't wait for next episode", etc.), the posting date and time of the comment, a like button 47 for the comment, and the "number of likes" for the comment are displayed. The like button 47 is an operating section that accepts the user's tap operation and is tapped by the user if the user likes the specifics of the comment posted by another user. When the like button 47 is tapped, the "number of likes" displayed on the right of the like button 47 is incremented by one. Therefore, the "number of likes" for a comment serves as a barometer indicating that other users are sympathetic to the comment, and hence, a comment with a large "number of likes" means that a large number of other users find sympathy with the comment.

In addition, in the lower section of the comment list screen, a comment input field 48 for inputting a comment is provided. Although the comment input field 48 is filled with a sentence, such as "Input comment", this is not an actually input comment. Also, when the comment input field 48 is tapped, the comment input field 48 moves to the center of the display 26, and a post operating section 49 and a software keyboard 50 are displayed in the lower section of the display 26, as shown in FIG. 5B. The post operating section 49 includes a normal post operating section (comment transmission operating section) 49*a* and a coin-attached post operating section (value-information-attached comment transmission operating section) 49*b*.

When a comment (characters, symbols, etc.) is input via the software keyboard 50, a comment, such as "This is also great!", that has been input via the software keyboard 50 is displayed in the comment input field 48, as shown in FIG. 5C. Thereafter, when the normal post operating section 49*a* is tapped, comment information indicating the input comment is transmitted from the user terminal 1 to the server 100. In other words, when the normal post operating section 49*a* is tapped, the comment displayed in the comment input field 48 is posted.

If the comment included in the transmitted comment information satisfies a predetermined condition, the server 100 transmits, to the user terminal 1, check information indicating that the comment has been accepted normally. Here, the predetermined condition is that, for example, the comment does not contain characters, etc. registered in a banned phrase list stored in the server 100.

In the user terminal 1, on the basis of the transmitted check information, the posted comment is displayed as the latest comment in the comment display area 46, as shown in FIG. 5D. Note that, in the case where the server 100 accepts the comment normally, the server 100 may transmit, to the user terminal 1, comment list information including the posted comment, and the user terminal 1 may display the comment display area 46 such that the posted comment becomes the latest comment on the basis of the received comment list information.

It should be noted, however, that even when the normal post operating section 49a is tapped with no input comment, the normal post operating section 49a does not react (no comment information is transmitted), and hence, no comment is posted.

Figure 6A:
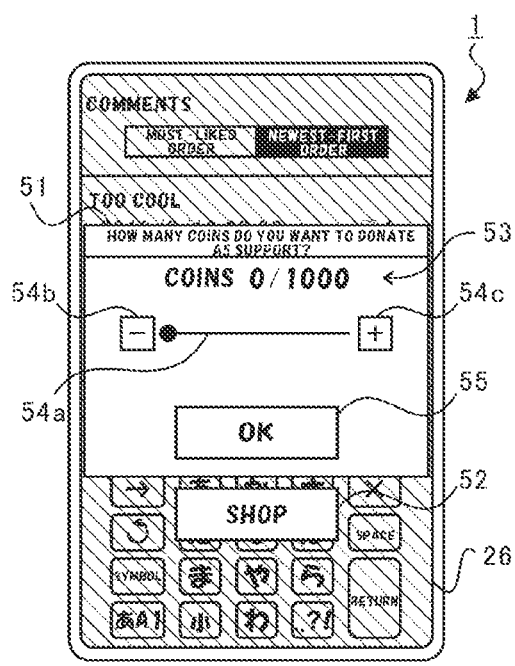
FIG. 6A is a first diagram for illustrating an example of a specified-number selection pop-up.
Figure 6B:
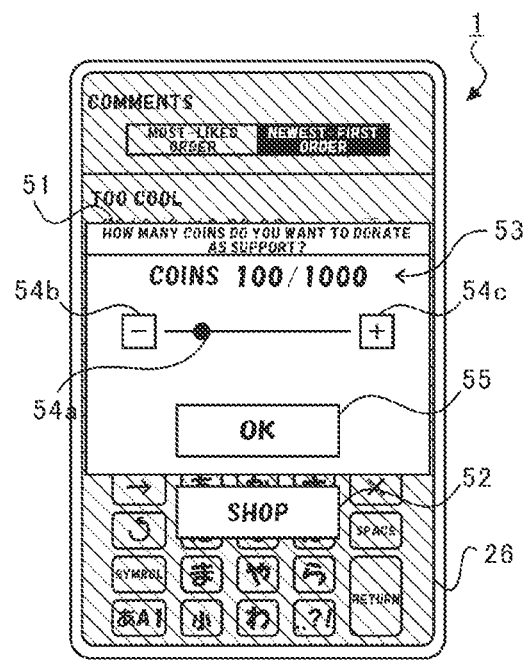
FIG. 6B is a second diagram for illustrating an example of the specified-number selection pop-up.
Figure 6C:
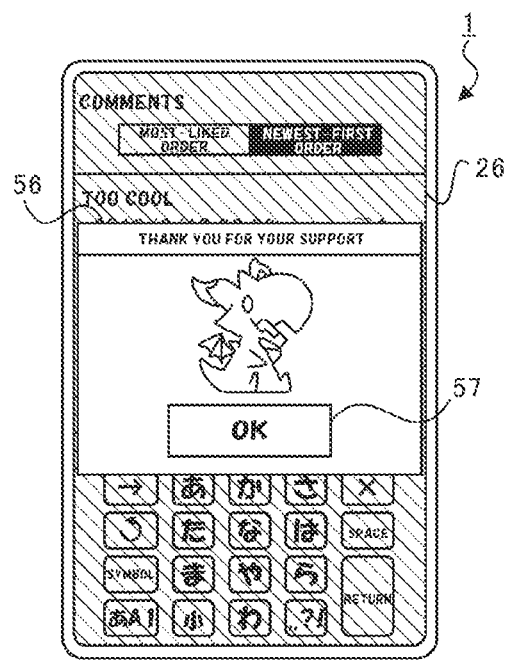
FIG. 6C is a diagram for illustrating an example of a coin-attached post ending pop-up.
Figure 6D:
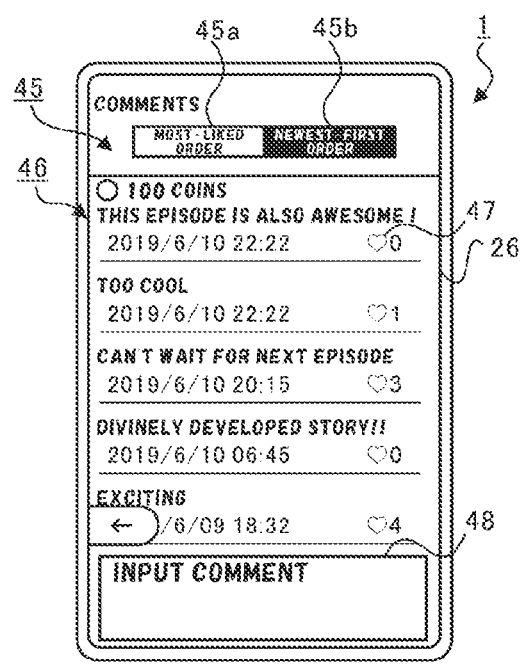
FIG. 6D is a diagram for illustrating an example of the comment list screen displayed after the end of coin-attached posting.

FIG. 6A is a first diagram for illustrating an example of a specified-number selection pop-up. FIG. 6B is a second diagram for illustrating an example of the specified-number selection pop-up. FIG. 6C is a diagram for illustrating an example of a coin-attached post ending pop-up. FIG. 6D is a diagram for illustrating an example of the comment list screen displayed after the end of coin-attached posting.

When the coin-attached post operating section 49b is tapped after a comment is input in the comment input field 48 via the software keyboard 50, a specified-number selection pop-up 51 and a shop operating section 52 are displayed on the foreground of the comment list screen, as shown in FIG. 6A.

In the specified-number selection pop-up 51, a specified-number display area 53, a specified-number selection operating bar 54a, specified-number operating sections 54b, 54c, and a confirmation operating section (value-information-attached comment transmission operating section) 55 captioned "OK" are provided. In the specified-number display area 53, the number of coins (hereinafter, referred to as the specified number, "0" here) to be donated (contributed) with this comment posting and the number of coins possessed by the user (number of coins associated with the user ID, "1000" here) are displayed. The specified number is set as 0 at the time the specified-number selection pop-up 51 is displayed. Note that the displayed number of coins possessed by the user represents the sum of the number of free coins and the number of paid coins; in other words, the number of free coins and the number of paid coins are not displayed individually.

The specified-number selection operating bar 54a, indicating the ratio of the specified number with respect to the number of coins possessed by the user, can accept the user's operation. When the specified-number selection operating bar 54a is subjected to a tap or seek operation by the user, the position indicated by the specified-number selection operating bar 54a is moved, as shown in FIG. 6B, and moreover, the specified number displayed in the specified-number display area 53 is changed ("100" here).

The specified-number operating section 54b, marked "−", is located on the left of the specified-number selection operating bar 54a. When the specified-number operating section 54b is tapped, the specified number is reduced at a preset proportion, and the specified number displayed in the specified-number display area 53 is reduced. Note that when the specified number is "0", the specified-number operating section 54b is displayed dark, as shown in FIG. 6A, thus not accepting the user's operation.

The specified-number operating section 54c, marked "+", is located on the right of the specified-number selection operating bar 54a. When the specified-number operating section 54c is operated, the specified number is increased at a preset proportion, and the specified number displayed in the specified-number display area 53 is increased. Note that when the specified number is equal to the number of coins possessed by the user, the specified-number operating section 54c is displayed dark, thus not accepting the user's operation.

When the confirmation operating section 55 is tapped after the specified number has been determined (set) by the user operating the specified-number selection operating bar 54a and the specified-number operating sections 54b, 54c, comment information indicating the input comment and specified-number information indicating the specified number that has been set are transmitted from the user terminal 1 to the server 100. If the comment included in the transmitted comment information satisfies a predetermined condition, the server 100 transmits, to the user terminal 1, check information indicating that the comment has been accepted normally. In addition, in the case where the server 100 accepts the comment normally, the server 100 reduces the number of coins associated with the user ID by the specified number that has been set and transmits a support appreciation image to the user terminal 1. On the basis of the transmitted support appreciation image, the user terminal 1 displays a coin-attached post ending pop-up 56 on the foreground of the comment list screen, as shown in FIG. 6C. Note that the donated coins are donated to, for example, the author. In addition, in the server 100, if the specified number that has been set is subtracted, the free coins are reduced with higher priority, and the paid coins are reduced only in the case where a number exceeding the number of free coins is to be subtracted.

In the coin-attached post ending pop-up 56, the support appreciation image transmitted from the server 100 is displayed, and moreover, a confirmation operating section 57 captioned "OK" is displayed. Note that the support appreciation image displayed in the coin-attached post ending pop-up 56 may differ for each of the e-comic books or may be common for all e-comic books. In addition, the support appreciation image may differ depending on the number of coins that have been donated with the current comment or may differ depending on the total number of donated coins.

Thereafter, when the confirmation operating section 57 is tapped, the comment list image shown in FIG. 6D is displayed on the display 26. At this time, the posted comment is displayed in the comment display area 46 as the latest comment, and moreover, the specified number, i.e., the number of donated coins is displayed in the comment display area 46 in association with the posted comment.

Thus, in this embodiment, coins can be donated to the author (donatee) only with a comment. Therefore, users wishing to donate coins need to input some comment in the comment input field 48. By doing so, the comment display function for inputting or displaying comments can be livened up.

Note that when the confirmation operating section 55 is tapped with a specified number of "0" while the specified-number selection pop-up 51 is displayed, only comment information is transmitted to the server 100 in the same manner as when the normal post operating section 49a is tapped. Therefore, if users who do not intend to donate coins have mistakenly tapped the coin-attached post operating section 49b after inputting a comment, they can post the comment without consuming (donating) coins by tapping the confirmation operating section 55 with a specified number set as "0".

In addition, when the shop operating section 52 is operated while the specified-number selection pop-up 51 is displayed, a screen for purchasing coins is displayed on the display 26. Then, when the user purchases coins, a comment list screen with the comment input field 48 filled with a comment is displayed on the display 26, as shown in FIG. 5C.

Figure 7B:
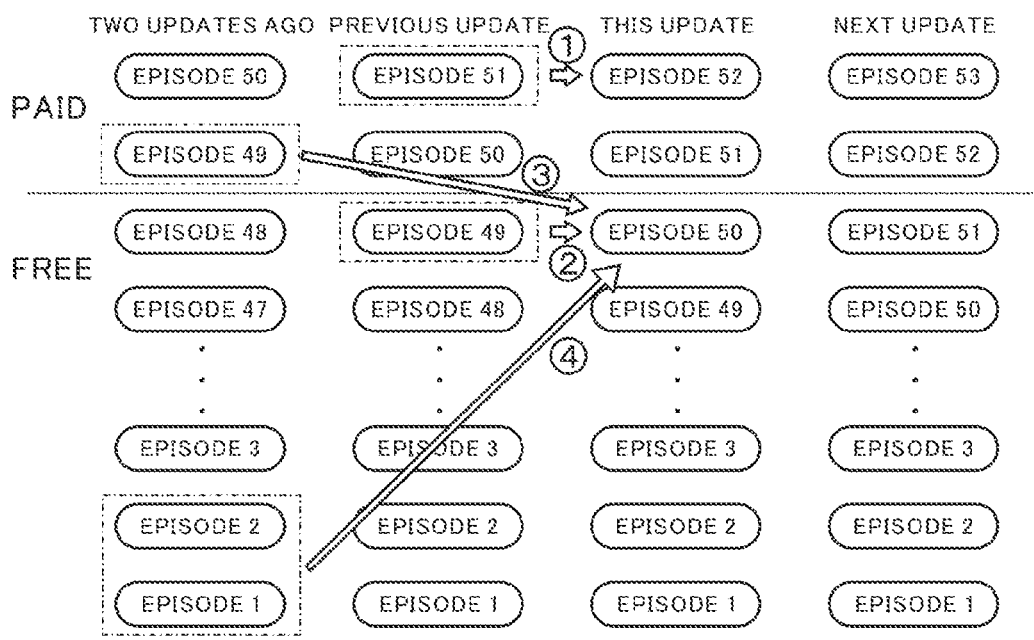
FIG. 7B is a diagram for illustrating an example where comic icons are displayed in a recommended-comics display area according to the view state.

FIG. 7A is a diagram for illustrating types of view state, determination conditions, start conditions, and end conditions. FIG. 7B is a diagram for illustrating an example where comic icons 34 are displayed in the recommended-comics display area 31 according to the view state.

As described above, the comic icons 34 of e-comic books that have been viewed by the user at least once are displayed in the recommended-comics display area 31 (refer to FIGS. 3A and 4D) when predetermined conditions (determination condition, display condition) are satisfied.

More specifically, when the home screen shown in FIG. 3A is displayed on the display 26 and when the end screen shown in FIG. 4D is displayed on the display 26, the user terminal 1 transmits recommendation request information for inquiring about the comic icons 34 to be displayed in the recommended-comics display area 31. Upon receiving recommendation request information, the server 100 determines, on the basis of the user's view history, whether or not the view state of each of the e-comic books corresponds to any of the four types shown in FIG. 7A. Note that the following descriptions assume that there are four types of view state from the first type to the fourth type, but any of these types may be removed or other types may be additionally included.

The server 100 determines whether or not there is an e-comic book corresponding to the first type "previous read-in-advance" serving as the type with the highest priority among the four types. The determination condition set for the first type "previous preemption read" is that the user has purchased (viewed) the paid chapter X (X is 1 or 2) episode(s) ahead from the free latest chapter since the previous update date. In other words, in the determination condition for the first type "previous read-in-advance", it is determined whether or not the user purchased (viewed) the latest paid chapter or the paid chapter one episode older than the latest chapter in such a manner as to be discriminated from each other. Then, in the case where there is an e-comic book satisfying the determination condition for the first type "previous read-in-advance", the server 100 determines that the type of view state of the e-comic book is the first type "previous read-in-advance".

Then, the server 100 determines whether or not an e-comic book satisfying the determination condition for the first type "previous read-in-advance" satisfies a start condition. The start condition set for the first type "previous read-in-advance" is that the user has not viewed the paid chapter X episode(s) ahead from the free latest chapter at this update.

In addition, the server 100 determines whether or not an e-comic book satisfying the determination condition for the first type "previous read-in-advance" satisfies an end condition. The end condition set for the first type "previous read-in-advance" is that the user has viewed both paid chapters X (X is 1 and 2) episode(s) ahead from the free latest chapter at this update.

In the case where an e-comic book satisfying the determination condition for the first type "previous read-in-advance" satisfies the start condition but does not satisfy the end condition, the server 100 determines that the e-comic book is an e-comic book to be displayed in the recommended-comics display area 31. This can be rephrased such that a display condition set for an e-comic book to be displayed in the recommended-comics display area 31 is that the e-comic book satisfies the start condition and does not satisfy the end condition.

Let us assume that, in the example in FIG. 7B, episode 52 has been added with this update, as shown by circled 1 in the figure. Under such an assumption, in the case where episode 51 (X=1), which is a paid chapter, has been purchased (viewed) since the previous update date and episode 52 (X=2) is not viewed, it is determined that the relevant e-comic book is an e-comic book that should be displayed in the recommended-comics display area 31.

Subsequently, the server 100 determines whether or not there is an e-comic book, except for the e-comic books corresponding to the first type "previous read-in-advance", corresponding to the second type "free latest episode", which has the next highest priority after the first type. The determination condition set for the second type "free latest episode" is that the user has viewed the free latest chapter since the previous update date. Then, in the case where there is an e-comic book satisfying the determination condition for the second type "free latest episode", the server 100 determines that the type of view state of the e-comic book is the second type "free latest episode".

Then, the server 100 determines whether or not an e-comic book satisfying the determination condition for the second type "free latest episode" satisfies a start condition. The start condition set for the second type "free latest episode" is that the user has not viewed the free chapter added with this update (the free latest chapter).

In addition, the server 100 determines whether or not an e-comic book satisfying the determination condition for the second type "free latest episode" satisfies an end condition. The end condition set for the second type "free latest episode" is that the user has viewed the free chapter added on this update date.

In the case where an e-comic book satisfying the determination condition for the second type "free latest episode" satisfies the start condition but does not satisfy the end condition, the server 100 determines that the e-comic book is an e-comic book to be displayed in the recommended-comics display area 31.

Let us assume that, in the example in FIG. 7B, episode 50 has been added as a free chapter with this update, as shown by circled 2 in the figure. Under such an assumption, in the case where episode 49, which was the free latest chapter, has been viewed since the previous update date and episode 50 is not viewed, it is determined that the relevant e-comic book is an e-comic book that should be displayed in the recommended-comics display area 31.

Subsequently, the server 100 determines whether or not there is an e-comic book, except for the e-comic books corresponding to the first type "previous read-in-advance" and the second type "free latest episode", corresponding to a third type "leave on read-in-advance", which has the next highest priority after the first type and the second type. The determination condition set for the third type "leave on read-in-advance" is that the user purchased (viewed) a paid chapter (episode N) at any timing. Then, in the case where there is an e-comic book satisfying the determination condition for the third type "leave on read-in-advance", the server 100 determines that the type of view state of the e-comic book is the third type "leave on read-in-advance".

Then, the server 100 determines whether or not an e-comic book satisfying the determination condition for the third type "leave on read-in-advance" satisfies a start condition. The start condition set for the third type "leave on read-in-advance" is that the chapter subsequent to the paid chapter that has been purchased (viewed) is the latest, unviewed free chapter (episode N+1).

In addition, the server 100 determines whether or not an e-comic book satisfying the determination condition for the third type "leave on read-in-advance" satisfies an end condition. The end condition set for the third type "leave on read-in-advance" is that the user has viewed the free chapter (episode N+1) subsequent to the paid chapter that has been purchased (viewed).

In the case where an e-comic book satisfying the determination condition for the third type "leave on read-in-advance" satisfies the start condition but does not satisfy the end condition, the server 100 determines that the relevant e-comic book is an e-comic book to be displayed in the recommended-comics display area 31.

As shown by circled 3 in the example in FIG. 7B, in the case where episode 49, as a paid chapter, has been viewed since two updates before and episode 50, which is added as a free chapter with this update, has not been viewed, it is determined that the relevant e-comic book is an e-comic book that should be displayed in the recommended-comics display area 31.

Subsequently, the server 100 determines whether or not there is an e-comic book, except for the e-comic books corresponding to the first type "previous read-in-advance", the second type "free latest episode", and the third type "leave on read-in-advance", corresponding to a fourth type "multiple episode view", which has the lowest priority. The determination condition set for the fourth type "multiple episode view" is that the user has viewed two or more chapters as episodes. Then, in the case where there is an e-comic book satisfying the determination condition for the fourth type "multiple episode view", the server 100 determines that the type of view state of the e-comic book is the fourth type "multiple episode view". Note that although the determination condition here is set as two or more chapters as episodes having been viewed, the number of viewed chapters may be any number equal to or larger than 2.

Then, the server 100 determines whether or not an e-comic book satisfying the determination condition for the fourth type "multiple episode view" satisfies a start condition. The start condition set for the fourth type "multiple episode view" is that the current date is within 30 days from the last viewed date of the relevant e-comic book.

In addition, the server 100 determines whether or not an e-comic book satisfying the determination condition for the fourth type "multiple episode view" satisfies an end condition. The end condition set for the fourth type "multiple episode view" is that the user has viewed the free latest chapter.

In the case where an e-comic book satisfying the determination condition for the fourth type "multiple episode view" satisfies the start condition but does not satisfy the end condition, the server 100 determines that the relevant e-comic book is an e-comic book to be displayed in the recommended-comics display area 31.

As shown by circled 4 in the example in FIG. 7B, in the case where episode 1 and episode 2 have been viewed since two updates before and no new chapters of the relevant e-comic book have been viewed, it is determined that the relevant e-comic book is an e-comic book that should be displayed in the recommended-comics display area 31.

Thus, in the case where an e-comic book corresponds to any one of the first type to the fourth type (satisfies a determination condition) and further satisfies a display condition, the server 100 determines that the relevant e-comic book is an e-comic book that should be displayed in the recommended-comics display area 31. Then, once identifying e-comic books that should be displayed in the recommended-comics display area 31, the server 100 transmits, to the user terminal 1, the comic icons 34 of the e-comic books as recommendation information to be displayed in the recommended-comics display area 31.

As a result, when displaying the home screen shown in FIG. 3A or the end screen shown in FIG. 4D on the display 26, the user terminal 1 can display, in the recommended-comics display area 31, the comic icons 34 corresponding to the e-comic books identified by the server 100.

By doing so, the user terminal 1 can display, in the recommended-comics display area 31, the comic icons 34 of e-comic books that have been viewed by the user at least once and that are likely to be viewed by the user, with priority according to the types of view state. Therefore, the user can easily view e-comic books of interest merely by tapping the corresponding comic icons 34 displayed in the recommended-comics display area 31.

Next, communication processes of the user terminal 1 and the server 100 will be described. Note that examples of basic communication processes for viewing an e-comic book, communication processes for determining a comic icon 34 to be displayed in the recommended-comics display area 31, and communication processes for posting a comment will be described here, and descriptions of other processes will be omitted.

(Communication Processes Between User Terminal 1 and Server 100)

Figure 8:
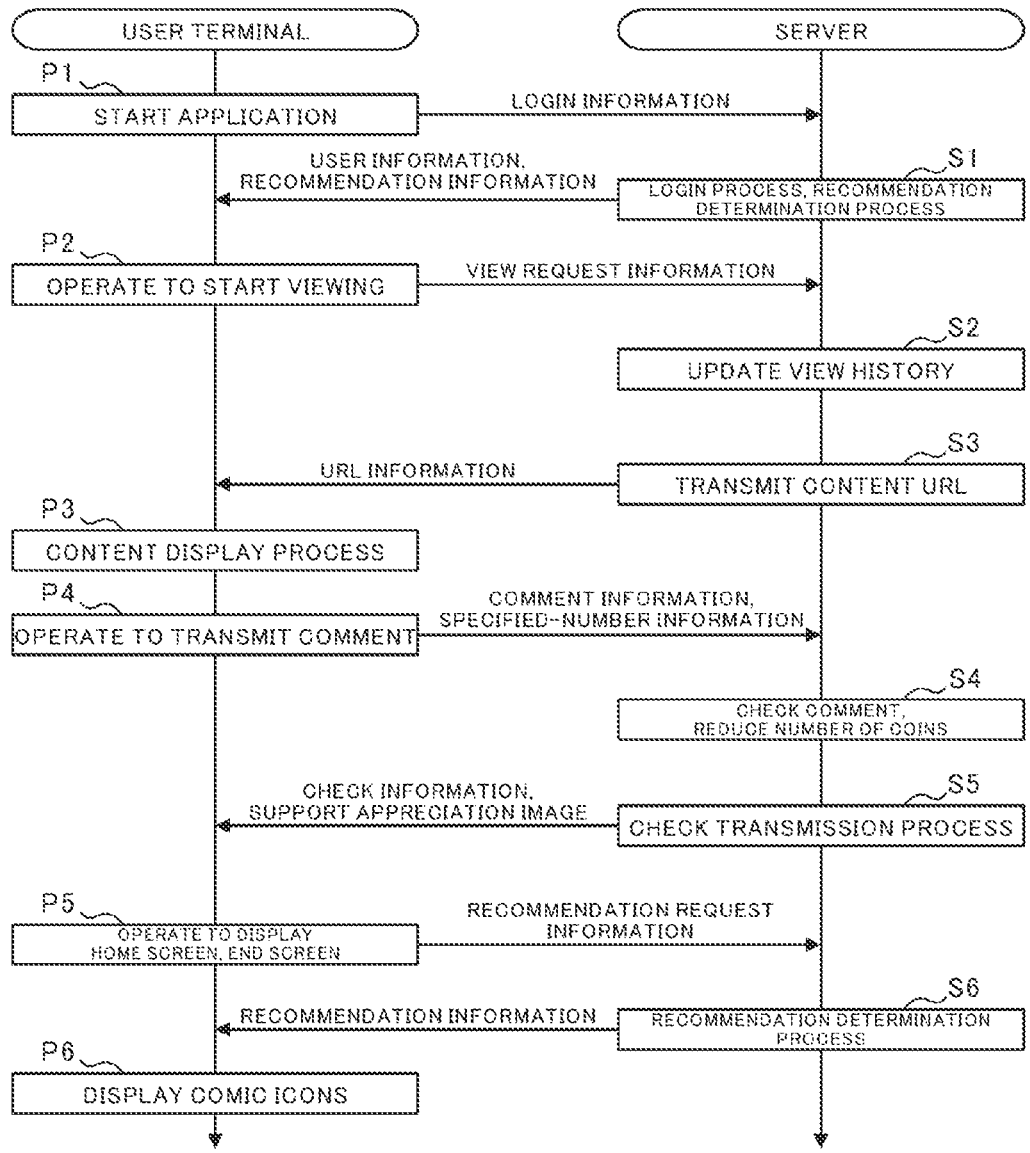
FIG. 8 is a sequence diagram for illustrating basic processes executed by the user terminal and the server.

FIG. 8 is a sequence diagram for illustrating basic processes in the user terminal 1 and the server 100. Note that, in the following description, a process in the user terminal 1 is denoted as Pn (n is any integer). Furthermore, a process in the server 100 is denoted as Sn (n is any integer). When the user starts the application in the user terminal 1 (P1), login information (including recommendation request information) is transmitted from the user terminal 1 to the server 100. Upon receiving the login information, the server 100 identifies the user ID associated with the login information and executes a login process and a recommendation determination process for identifying an e-comic book that should be displayed in the recommended-comics display area 31 (S1). Here, the server 100 transmits, to the user terminal 1, the user information corresponding to the identified user ID and recommendation information.

In addition, when any one of the chapters is tapped on the chapter selection screen shown in FIG. 3D, the user terminal 1 transmits view request information for viewing that chapter (P2). Upon receiving the view request information, the server 100 updates the view history (S2) and transmits URL information indicating a URL at which an image of the chapter is stored (S3). Upon receiving the URL information, the user terminal 1 accesses the URL included in the URL information and executes a content display process for displaying a page image 42 of that chapter on the display 26 (P3).

In addition, in the user terminal 1, when the post operating section 49 is operated with a comment input in the comment input field 48 while the comment list screen shown in FIG. 5C is displayed on the display 26, either only comment information indicating the comment or comment information having specified-number information added thereto is transmitted to the server 100 (P4). Upon receiving either comment information or comment information along with specified-number information, the server 100 checks the comment included in the comment information (S4). In addition, in the case where the server 100 receives specified-number information, the server 100 subtracts the specified number from the number of coins associated with the user ID (S4). In addition, the server 100 transmits check information, transmits a support appreciation image, etc. (S5).

In addition, when an operation for displaying the home screen shown in FIG. 3A or the end screen shown in FIG. 4D is performed in the user terminal 1, the user terminal 1 transmits recommendation request information to the server 100 (P5). Upon receiving the recommendation request information, the server 100 executes the recommendation determination process (S6) and transmits recommendation information to the user terminal 1. Upon receiving the recommendation information, the user terminal 1 displays, in the recommended-comics display area 31 on the home screen or the end screen, the comic icons 34 of the e-comic books included in the recommendation information (P6).

(Functional Configuration of User Terminal 1)

Figure 9:
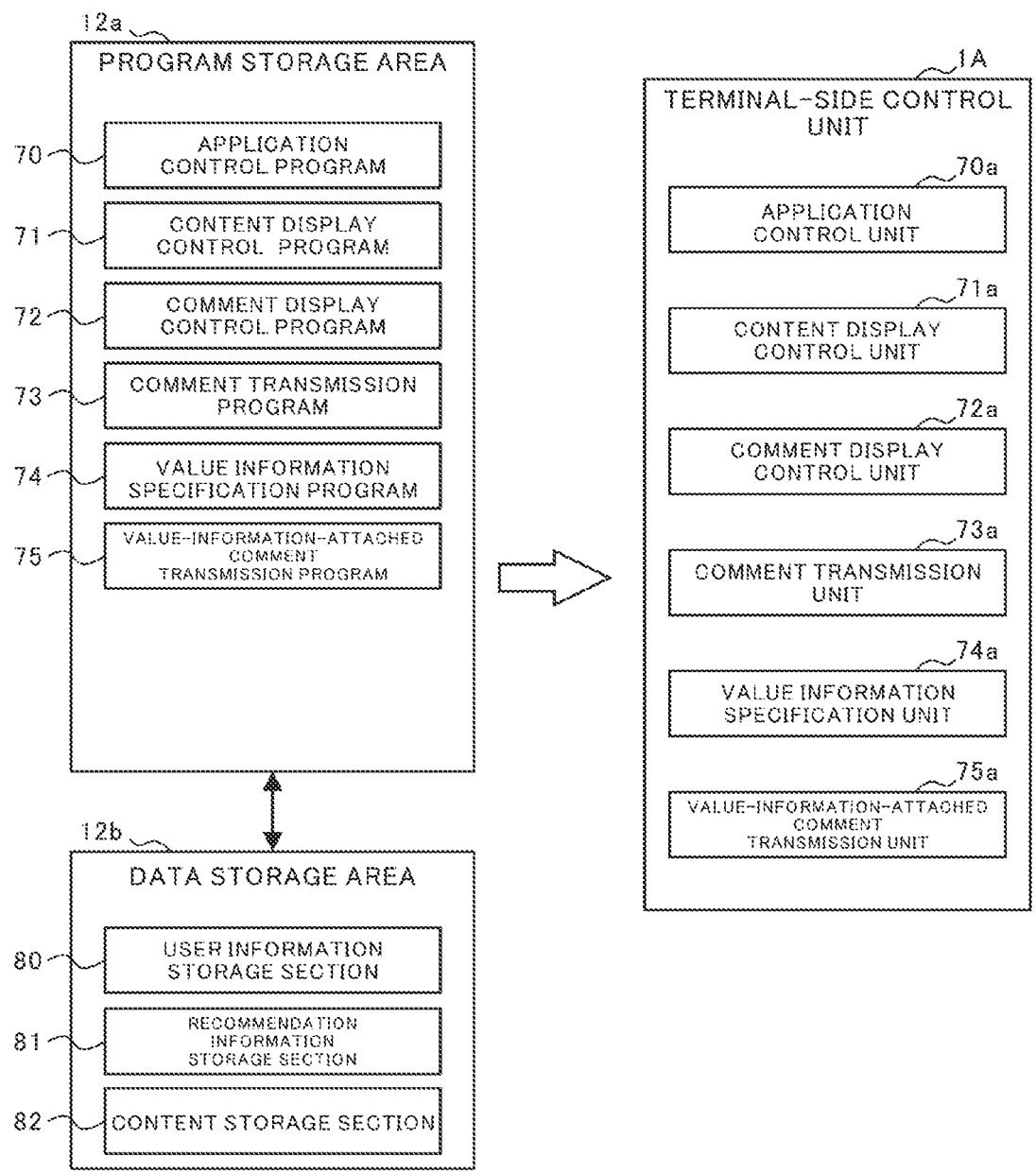
FIG. 9 is a diagram for illustrating the memory configuration in the user terminal and functions of the user terminal as a computer.

FIG. 9 is a diagram for illustrating the configuration of the memory 12 in the user terminal 1 and the functions of the user terminal 1 as a computer. In the memory 12, a program storage area 12a and a data storage area 12b are provided. When the application is executed, the CPU 10 stores terminal-side control programs (modules) in the program storage area 12a.

The terminal-side control programs include an application control program 70, a content display control program 71, a comment display control program 72, a comment transmission program 73, a value information specification program 74, and a value-information-attached comment transmission program 75. Note that the programs listed in FIG. 9 are examples, and a large number of other programs are also provided as the terminal-side control programs.

The data storage area 12b includes, as storage sections for storing data, a user information storage section 80, a recommendation information storage section 81, and a content storage section 82. Note that these storage sections are examples, and a large number of other storage sections are provided in the data storage area 12b.

The CPU 10 runs the individual programs stored in the program storage area 12a and updates the data in the individual storage sections of the data storage area 12b. Furthermore, the CPU 10 runs the individual programs stored in the program storage area 12a, thereby causing the user terminal 1 (computer) to function as a terminal-side control unit 1A. The terminal-side control unit 1A includes an application control unit 70a, a content display control unit 71a, a comment display control unit 72a, a comment transmission unit 73a, a value information specification unit 74a, and a value-information-attached comment transmission unit 75a.

More specifically, the CPU 10 runs the application control program 70, thereby causing the computer to function as the application control unit 70a. Similarly, the CPU 10 runs the content display control program 71, the comment display control program 72, the comment transmission program 73, the value information specification program 74, and the value-information-attached comment transmission program 75, thereby causing the computer to function as the content display control unit 71a, the comment display control unit 72a, the comment transmission unit 73a, the value information specification unit 74a, and the value-information-attached comment transmission unit 75a, respectively.

The application control unit 70a executes an application control process for controlling display of the entire application for viewing content. For example, the application control program 70 displays, on the display 26, the home screen according to an operation applied to the user terminal 1. In addition, when user information is updated, the application control unit 70a updates information in the user information storage section 80.

When URL information is received from the server 100, the content display control unit 71a accesses the URL included in the received URL information. Then, the content display control unit 71a downloads the page image 42 from the accessed URL and stores the downloaded page image 42 in the content storage section 82. In addition, the content display control unit 71a displays the page image 42, on the display 26, stored in the content storage section 82 such that the page image 42 can be viewed.

When the comment operating section 38 is tapped, the comment display control unit 72a displays the comment list image on the display 26. In addition, when a comment is input via the software keyboard 50, the comment display control unit 72a displays the input comment in the comment input field 48.

When the normal post operating section 49a is tapped, the comment transmission unit 73a transmits, to the server 100, comment information including the comment input in the comment input field 48.

When the coin-attached post operating section 49b is tapped, the value information specification unit 74a displays the specified-number selection pop-up 51 on the foreground of the comment list screen. In addition, the value information specification unit 74a sets a specified number according to an operation applied to the specified-number selection operating bar 54a and the specified-number operating sections 54b, 54c displayed in the specified-number selection pop-up 51.

When the confirmation operating section 55 displayed in the specified-number selection pop-up 51 is tapped, the value-information-attached comment transmission unit 75a transmits, to the server 100, comment information including the comment input in the comment input field 48 and specified-number information including the specified number that has been set.

(Specific Processes in User Terminal 1)

Figure 10:
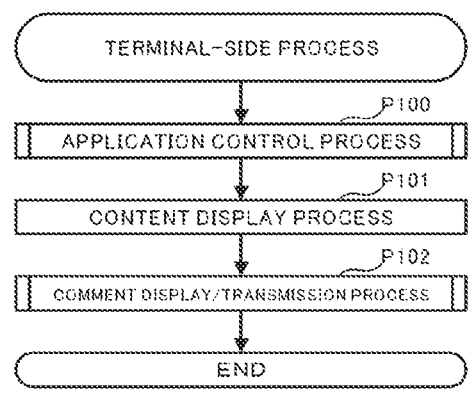
FIG. 10 is a flowchart for illustrating an example of a terminal-side process in the user terminal.

FIG. 10 is a flowchart for illustrating an example of a terminal-side process in the user terminal 1. In the terminal-side process, the application control unit 70a executes the application control process including a recommendation display process for displaying the comic icons 34 in the recommended-comics display area 31 (P100). In addition, the content display control unit 71a executes the content display process for displaying the e-comic book screen on the display 26 (P101). The comment display control unit 72a, the comment transmission unit 73a, the value information specification unit 74a, and the value-information-attached comment transmission unit 75a execute a comment display/transmission process for displaying comments and transmitting comments (P102).

Figure 11:
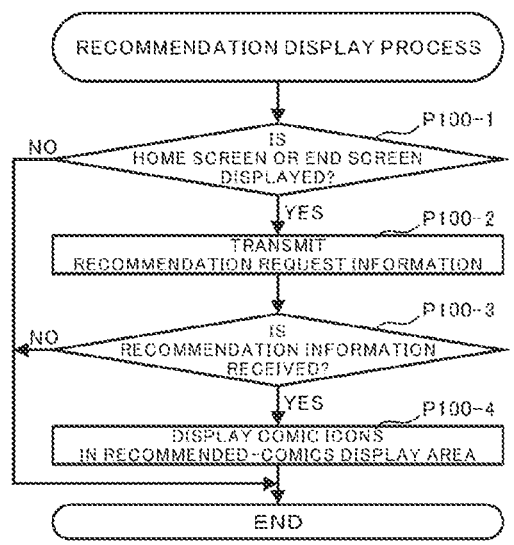
FIG. 11 is a flowchart for illustrating an example of a recommendation display process in the user terminal.

FIG. 11 is a flowchart for illustrating an example of the recommendation display process in the user terminal 1. When the home screen or the end screen is to be displayed on the display 26 (YES in P100-1), the application control unit 70a transmits recommendation request information to the server 100 (P100-2). Then, when recommendation information is received from the server 100 (YES in P100-3), the application control unit 70a stores the recommendation information in the recommendation information storage section 81 and displays the comic icons 34 in the recommended-comics display area 31 (P100-4).

Figure 12:
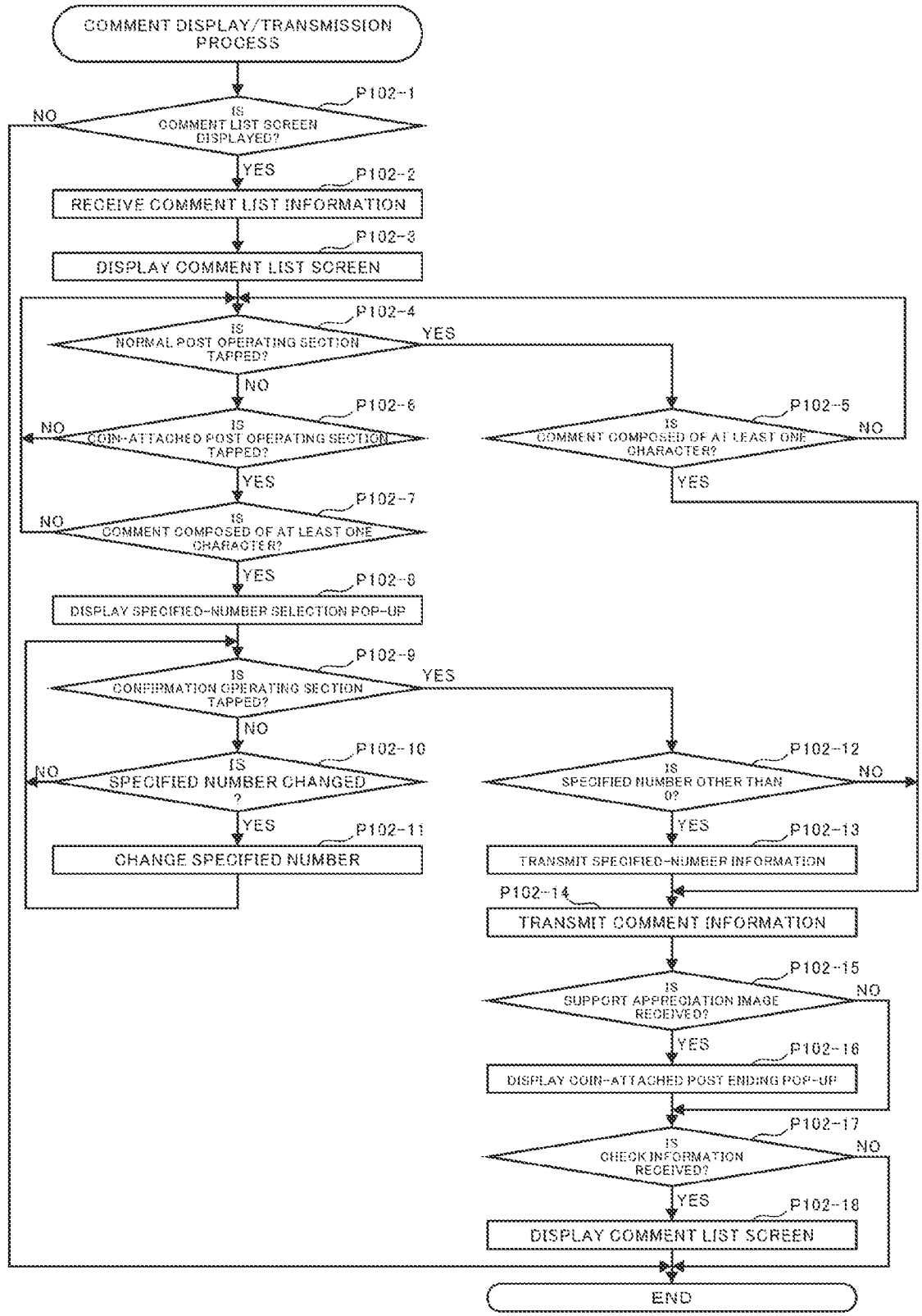
FIG. 12 is a flowchart for illustrating an example of a comment display/transmission process in the user terminal.

FIG. 12 is a flowchart for illustrating an example of the comment display/transmission process in the user terminal 1. When the comment list screen is to be displayed on the display 26 (YES in P102-1), the comment display control unit 72*a* transmits comment request information for requesting a list of comments on the chapters provided with the comment operating section 38. Then, when comment list information is received from the server 100 (P102-2), the comment display control unit 72*a* displays the comment list screen on the display 26 on the basis of the comment list information (P102-3).

In addition, when the normal post operating section 49*a* is tapped after the comment input field 48 has been tapped (YES in P102-4), the comment transmission unit 73*a* transmits comment information including the comment input in the comment input field 48 (P102-14), as long as the comment is composed of at least one character (YES in P102-5).

On the other hand, in the case where the coin-attached post operating section 49*b* is tapped (YES in P102-6), the value information specification unit 74*a* displays the specified-number selection pop-up 51 on the display 26 (P102-8), as long as a comment composed of at least one character is input in the comment input field 48 (YES in P102-7).

Then, when the specified number is changed as a result of the specified-number selection operating bar 54*a* and the specified-number operating sections 54*b*, 54*c* being operated (YES in P102-10) before the confirmation operating section 55 in the specified-number selection pop-up 51 is tapped (NO in P102-9), the value information specification unit 74*a* sets (changes) the specified number according to the operation (P102-11).

Thereafter, when the confirmation operating section 55 in the specified-number selection pop-up 51 is tapped (YES in P102-9), the value-information-attached comment transmission unit 75*a* transmits, to the server 100, specified-number information indicating the specified number that has been set (P102-13), as long as the specified number is other than 0 (YES in P102-12). In addition, the comment transmission unit 73*a* transmits comment information (P102-14).

In addition, when a support appreciation image is received from the server 100 (YES in P102-15), the comment display control unit 72*a* displays the coin-attached post ending pop-up 56 on the display 26 (P102-16). In addition, when check information is received from the server 100 (YES in P102-17), the comment display control unit 72*a* displays the comment list screen on the display 26 (P102-18).

(Functional Configuration of Server 100)

Figure 13:
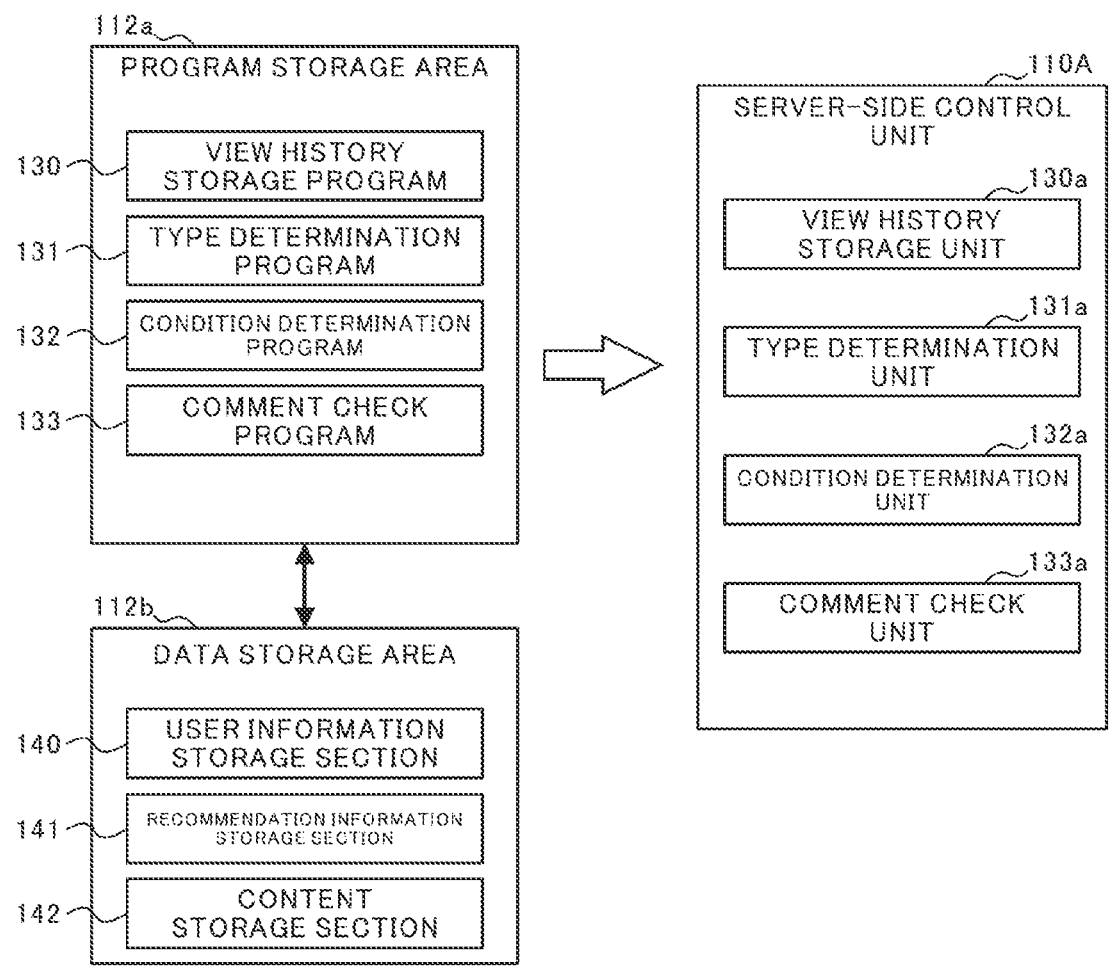
FIG. 13 is a diagram for illustrating the memory configuration in the server and functions of the server as a computer.

FIG. 13 is a diagram for illustrating the configuration of the memory 112 in the server 100 and functions of the server 100 as a computer. In the memory 112, a program storage area 112*a* and a data storage area 112*b* are provided. The CPU 110 stores server-side control programs (modules) in the program storage area 112*a*.

The server-side control programs include a view history storage program 130, a type determination program 131, a condition determination program 132, and a comment check program 133. Note that the programs listed in FIG. 13 are examples, and a large number of other programs are also provided as the server-side control programs.

The data storage area 112*b* includes, as storage sections for storing data, a user information storage section 140, a recommendation information storage section 141, and a content storage section 142. Note that these storage sections are examples, and a large number of other storage sections are provided in the data storage area 112*b*.

The CPU 110 runs the individual programs stored in the program storage area 112*a* and updates the data in the individual storage sections of the data storage area 112*b*.

Furthermore, the CPU 110 runs the individual programs stored in the program storage area 112*a*, thereby causing the server 100 (computer) to function as a server-side control unit 110A. The server-side control unit 110A includes a view history storage unit 130*a*, a type determination unit 131*a*, a condition determination unit 132*a*, and a comment check unit 133*a*.

More specifically, the CPU 10 runs the view history storage program 130, thereby causing the computer to function as the view history storage unit 130*a*. Similarly, the CPU 10 runs the type determination program 131, the condition determination program 132, and the comment check program 133, thereby causing the computer to function as the type determination unit 131*a*, the condition determination unit 132*a*, and the comment check unit 133*a*, respectively.

Each time view request information is transmitted from the user terminal 1, the view history storage unit 130*a* updates, for each user ID, the view history on the basis of the view request information and stores the updated view history in the user information storage section 140. In addition, on the basis of the view request information, the view history storage unit 130*a* transmits, to the user terminal 1, URL information indicating the URL of the page image 42 stored in the content storage section 142.

When recommendation request information is received from the user terminal 1, the type determination unit 131*a* determines the type of view state of each e-comic book on the basis of the view history stored in the user information storage section 140.

The condition determination unit 132*a* determines whether or not each e-comic book satisfies the display condition based on the type of view state of the e-comic book determined by the type determination unit 131*a*. In addition, the condition determination unit 132*a* reads the comic icons 34 of e-comic books satisfying the display condition from the recommendation information storage section 141 and transmits the comic icons 34 as recommendation information to the user terminal 1.

When comment information is received from the user terminal 1, the comment check unit 133*a* determines whether or not the comment included in the comment information satisfies a predetermined condition. When specified-number information is received from the user terminal 1, the comment check unit 133*a* subtracts the specified number from the number of coins associated with the user ID.

(Specific Processes in Server 100)

Figure 14:
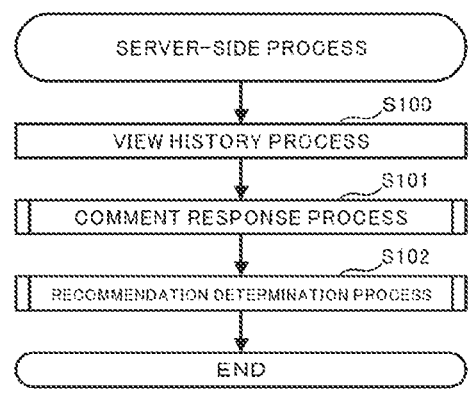
FIG. 14 is a flowchart for illustrating an example of a server-side process in the server.

FIG. 14 is a flowchart for illustrating an example of the server-side process in the server 100. In the server-side process, the view history storage unit 130*a* executes a view history process for transmitting URL information, updating the view history, etc. on the basis of the view request information received from the user terminal 1 (S100). In addition, the comment check unit 133*a* executes a comment response process on the basis of the comment information or specified-number information received from the user terminal 1 (S101). In addition, when recommendation request information is received from the user terminal 1, the type determination unit 131*a* and the condition determination unit 132*a* execute the recommendation determination process (S102).

Figure 15:
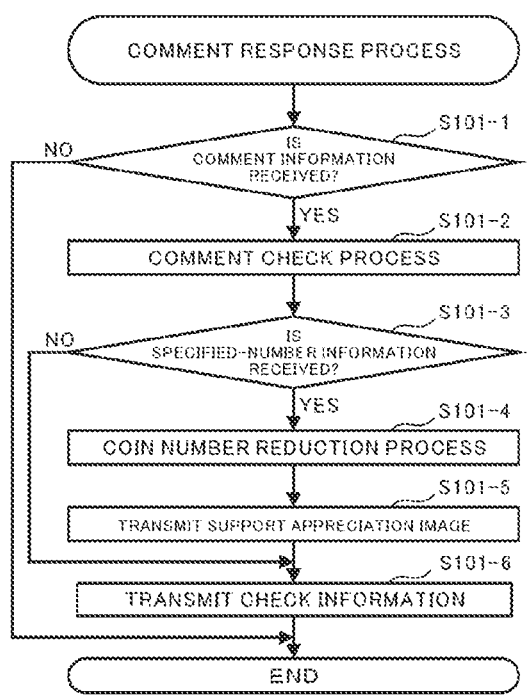
FIG. 15 is a flowchart for illustrating an example of a comment response process in the server.

FIG. 15 is a flowchart for illustrating an example of the comment response process in the server 100. When comment information is received (YES in S101-1), the comment check unit 133*a* executes a comment check process for checking the comment included in the comment information (S101-2). In addition, in the case where the comment information has specified-number information added thereto, i.e., in the case where specified-number information is received along with the comment information (YES in S101-3), the comment check unit 133a executes a coin number reduction process for subtracting the specified number included in the specified-number information from the number of coins associated with the user ID (S101-4). Thereafter, the comment check unit 133a transmits a support appreciation image to the user terminal 1 (S101-5). In addition, the comment check unit 133a transmits check information to the user terminal 1 (S101-6).

Figure 16:
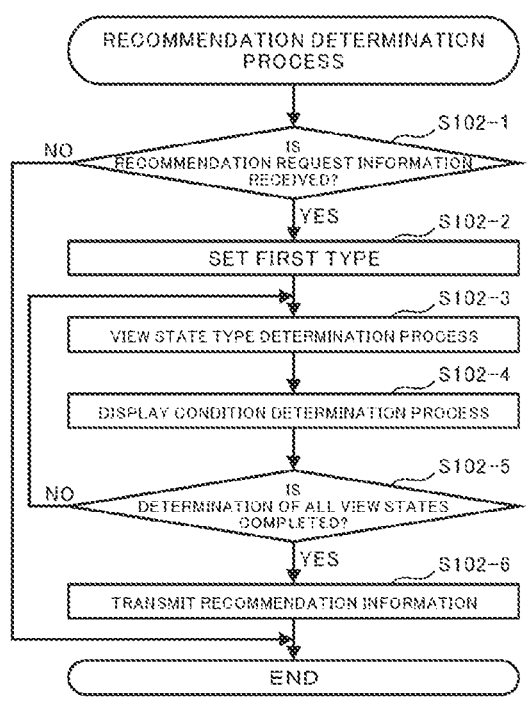
FIG. 16 is a flowchart for illustrating an example of a recommendation determination process in the server.

FIG. 16 is a flowchart for illustrating an example of the recommendation determination process in the server 100. When recommendation request information is received (YES in S102-1), the type determination unit 131a sets the first type (S102-2) and executes a view state type determination process for determining, on the basis of the view history, whether or not there is an e-comic book satisfying the determination condition for the first type (S102-3). Then, for e-comic books satisfying the determination condition for the first type, the condition determination unit 132a executes a display condition determination process for determining whether or not there is an e-comic book satisfying the display condition (S102-4). Thereafter, if a determination as to all types of view state is not completed (NO in S102-5), the type determination unit 131a and the condition determination unit 132a execute the processes in S102-3 and S102-4 for the type of view state with priority lower by one level.

Then, when a determination as to all types of view state is completed (YES in S102-5), the condition determination unit 132a transmits, to the user terminal 1, recommendation information including the comic icons 34 of e-comic books satisfying the display conditions (S102-6).

As described above, the user terminal 1 includes the application control program 70, the content display control program 71, the comment display control program 72, the comment transmission program 73, the value information specification program 74, and the value-information-attached comment transmission program 75. In addition, the user terminal 1 includes the application control unit 70a, the content display control unit 71a, the comment display control unit 72a, the comment transmission unit 73a, the value information specification unit 74a, and the value-information-attached comment transmission unit 75a. However, these programs and functional units may be provided in the server 100.

In addition, the server 100 includes the view history storage program 130, the type determination program 131, the condition determination program 132, and the comment check program 133. In addition, the server 100 includes the view history storage unit 130a, the type determination unit 131a, the condition determination unit 132a, and the comment check unit 133a. However, these programs and functional units may be provided in the user terminal 1.

In addition, content may be composed of a plurality of images (paid partial content items) created by a plurality of respective authors, so that a competition is held over the number of coins donated to the individual images. In this case, the user who has purchased the image with the largest number of coins may be provided with a new image (partial content item). By doing so, the desire to support the author can be enhanced.

In addition, the end conditions in the recommendation determination process may include a certain period of time, such as 30 days, having elapsed.

In addition, when displaying comments on the comment list screen, the user terminal 1 may display each of the comments by changing the display manner (appearance), such as the color and size, according to the number of coins donated to the comment.

In addition, the user terminal 1 may be provided with a screen that allows coin usage history to be viewed, as a screen that can be shifted from the home screen, etc. On this screen that allows the coin usage history to be viewed, purchased paid chapters (paid partial content items), e-comic books (content) to which coins (value information) have been donated, and the number of donated coins may be displayed.

In the above-described embodiment, it is determined whether or not all types of the first type to the fourth type satisfy the respective determination conditions and display conditions in the recommendation determination process. However, when there is an e-comic book (content) satisfying the determination condition and the display condition for, for example, the first type, the recommendation determination process may be ended at that time.

In addition, the value information may be information on cash.

In addition, comments displayed on the comment list screen may be sorted according to the number of coins, in addition to the most-liked order and the newest-first order. In this case, it is sufficient to display the comments in ascending or descending order of the number of donated coins.

Although an aspect of the embodiment has been described with reference to the accompanying drawings, it is needless to say that the present invention is not limited to the embodiment described above. It is obvious that a person skilled in the art could conceive of various variations and modifications within the scope recited in claims, and it will be understood that those variations and modifications naturally fall within the technical scope of the present invention.

What is claimed is:

1. A non-transitory computer readable medium storing a program causing a computer to execute a method comprising:

viewably displaying, based on an operation performed by a user, one or more of a plurality of partial content items constituting content;

storing view history of the content;

determining, based on the view history, a view state of the content from among a plurality of view state types, wherein the view state is determined in response to determining that at least one of the plurality of partial content items constituting the content has been viewed;

determining, based on the type of view state, whether the content satisfies a display condition set for the type of view state, the display condition including a condition that the content has a partial content item that has not been viewed; and displaying, in a predetermined display area, an image indicating the content in response to determining that the content satisfies the display condition, wherein the plurality of partial content items comprises at least one paid partial content item that can be viewed by consuming predetermined value information and at least one free partial content item that can be viewed without consuming the predetermined value information, wherein, at a predetermined update timing, a new paid partial content item is added to the content and at least a part of the at least one paid partial content item is changed to a new free partial content item, and wherein the display condition of the view state comprises that the partial content item changed to a free partial content item at the predetermined update timing has not been viewed, wherein determining the view state of the content comprises:

determining whether the view state is a first view state type from among the plurality of view state types in response to determining that the at least one paid partial content item comprises a paid partial content item that has been viewed by the user since a previous update timing, and determining, in response to determining that the view state of the content is not the first view state type, that the view state is a second view state type from among the plurality of view state types in response to determining that the user viewed all of the at least one free partial content item before a latest update timing, wherein the display condition is set as a first condition for the first view state type that the at least one paid partial content item comprises a paid partial content item that has not been viewed since a latest update timing, wherein the display condition is set as a second condition for the second view state type that the at least one free partial content item comprises a free partial content item that has not been viewed since the latest update timing, and wherein in determining the view state, the first view state type has priority over the second view state type.

2. The non-transitory computer readable medium according to claim 1, wherein determining the view state of the content comprises determining that the view state is a third view state type in response to determining that the user has viewed a paid partial content item at some point, and the display condition is set as a third condition that the at least one free partial content item comprises a free partial content item that has not been viewed since the latest update timing.

3. The non-transitory computer readable medium according to claim 1, wherein determining the view state of the content comprises determining that the view state is a third view state type in response to determining that the user has viewed two or more of the plurality of partial content items constituting the content, and the display condition is set as a third condition that the plurality of partial content items constituting the content comprise a partial content item that has not been viewed.

4. An information processing method comprising:

viewably displaying, based on an operation performed by a user, one or more of a plurality of partial content items constituting content;

storing view history of the content;

determining, based on the view history, a view state of the content from among a plurality of view state types, wherein the view state is determined in response to determining that at least one of the plurality of partial content items constituting the content has been viewed;

determining, based on the type of view state, whether the content satisfies a display condition set for the type of view state, the display condition including a condition that the content has a partial content item that has not been viewed; and displaying, in a predetermined display area, an image indicating the content in response to determining that the content satisfies the display condition, wherein the plurality of partial content items comprises at least one paid partial content item that can be viewed by consuming predetermined value information and at least one free partial content item that can be viewed without consuming the predetermined value information, wherein, at a predetermined update timing, a new paid partial content item is added to the content and at least a part of the at least one paid partial content item is changed to a new free partial content item, and wherein the display condition of the view state comprises that the partial content item changed to a free partial content item at the predetermined update timing has not been viewed, wherein determining the view state of the content comprises:

determining whether the view state is a first view state type from among the plurality of view state types in response to determining that the at least one paid partial content item comprises a paid partial content item that has been viewed by the user since a previous update timing, and determining, in response to determining that the view state of the content is not the first view state type, that the view state is a second view state type from among the plurality of view state types in response to determining that the user viewed all of the at least one free partial content item before a latest update timing, wherein the display condition is set as a first condition for the first view state type that the at least one paid partial content item comprises a paid partial content item that has not been viewed since a latest update timing, wherein the display condition is set as a second condition for the second view state type that the at least one free partial content item comprises a free partial content item that has not been viewed since the latest update timing, and wherein in determining the view state, the first view state type has priority over the second view state type.

5. An information processing system comprising a computer configured to execute a method comprising: viewably displaying, based on an operation performed by a user, one or more of a plurality of partial content items constituting content;

storing view history of the content;

determining, based on the view history, a view state of the content from among a plurality of view state types, wherein the view state is determined in response to determining that at least one of the plurality of partial content items constituting the content has been viewed;

determining, based on the type of view state, whether the content satisfies a display condition set for the type of view state, the display condition including a condition that the content has a partial content item that has not been viewed; and displaying, in a predetermined display area, an image indicating the content in response to determining that the content satisfies the display condition, wherein the plurality of partial content items comprises at least one paid partial content item that can be viewed by consuming predetermined value information and at least one free partial content item that can be viewed without consuming the predetermined value information, wherein, at a predetermined update timing, a new paid partial content item is added to the content and at least a part of the at least one paid partial content item is changed to a new free partial content item, and wherein the display condition of the view state comprises that the partial content item changed to a free partial content item at the predetermined update timing has not been viewed, wherein determining the view state of the content comprises:
  determining whether the view state is a first view state type from among the plurality of view state types in response to determining that the at least one paid partial content item comprises a paid partial content item that has been viewed by the user since a previous update timing, and determining, in response to determining that the view state of the content is not the first view state type, that the view state is a second view state type from among the plurality of view state types in response to determining that the user viewed all of the at least one free partial content item before a latest update timing, wherein the display condition is set as a first condition for the first view state type that the at least one paid partial content item comprises a paid partial content item that has not been viewed since a latest update timing, wherein the display condition is set as a second condition for the second view state type that the at least one free partial content item comprises a free partial content item that has not been viewed since the latest update timing, and wherein in determining the view state, the first view state type has priority over the second view state type.

* * * * *